(12) United States Patent
Imbe

(10) Patent No.: US 11,749,112 B2
(45) Date of Patent: Sep. 5, 2023

(54) WARNING DEVICE, WARNING METHOD, AND WARNING PROGRAM

(71) Applicant: JVCKENWOOD CORPORATION, Yokohama (JP)

(72) Inventor: Satoru Imbe, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 0 days.

(21) Appl. No.: 17/866,371

(22) Filed: Jul. 15, 2022

(65) Prior Publication Data

US 2022/0351528 A1    Nov. 3, 2022

Related U.S. Application Data

(63) Continuation of application No. 16/591,537, filed on Oct. 2, 2019, now Pat. No. 11,423,664, which is a
(Continued)

(30) Foreign Application Priority Data

Mar. 10, 2015 (JP) .................. 2015-046584
Mar. 10, 2015 (JP) .................. 2015-046585

(51) Int. Cl.
*H04N 7/18* (2006.01)
*G08G 1/16* (2006.01)
(Continued)

(52) U.S. Cl.
CPC ............ *G08G 1/165* (2013.01); *B60K 35/00* (2013.01); *B60R 1/00* (2013.01); *B60R 21/00* (2013.01);
(Continued)

(58) Field of Classification Search
None
See application file for complete search history.

(56) References Cited

U.S. PATENT DOCUMENTS 11,423,664 B2 * 8/2022 Imbe ................ H04N 23/667
2008/0197284 A1   8/2008 Ebenstein et al.
(Continued)

FOREIGN PATENT DOCUMENTS

CN    101246219 A    8/2008
CN    102782741 A    11/2012
(Continued)

OTHER PUBLICATIONS

International Search Report and Written Opinion for PCT/JP2016/001136, dated May 24, 2016, in 7 pages.

*Primary Examiner* — Eileen M Adams
(74) *Attorney, Agent, or Firm* — Procopio, Cory, Hargreaves & Savitch LLP

(57) ABSTRACT

A warning device according to the present invention includes an image acquisition unit configured to acquire an image group including a plurality of images taken in succession, a detection unit configured to perform detection of an object on each of images in the image group, a determination unit configured to compare detection results of the object in the image group in chronological order and determine a degree of movement of the object, and a warning unit configured to issue a warning in accordance with the determined degree of movement, wherein
the image acquisition unit acquires a plurality of image groups respectively based on a plurality of filter characteristics and the determination unit compares corresponding images between the plurality of image groups and thereby selects an image with high detection accuracy for each time
(Continued)

period, compares the selected images in chronological order, and determines the degree of movement of the object.

7 Claims, 20 Drawing Sheets

Related U.S. Application Data continuation of application No. 15/698,099, filed on Sep. 7, 2017, now Pat. No. 10,474,910, which is a continuation of application No. PCT/JP2016/001136, filed on Mar. 2, 2016.

(51) Int. Cl.
| | | |
|---|---|---|
| *G06T 1/00* | (2006.01) | |
| *B60R 21/00* | (2006.01) | |
| *G06V 20/58* | (2022.01) | |
| *H04N 23/63* | (2023.01) | |
| *H04N 23/667* | (2023.01) | |
| *B60K 35/00* | (2006.01) | |
| *B60R 1/00* | (2022.01) | |
| *G06V 40/10* | (2022.01) | |

(52) U.S. Cl.
CPC ............ *G06T 1/00* (2013.01); *G06V 20/58* (2022.01); *G08G 1/16* (2013.01); *G08G 1/166* (2013.01); *H04N 7/18* (2013.01); *H04N 23/634* (2023.01); *H04N 23/667* (2023.01); *B60K 2370/152* (2019.05); *B60R 2300/30* (2013.01); *B60R 2300/8093* (2013.01); *G06V 40/10* (2022.01)

(56) References Cited

U.S. PATENT DOCUMENTS

2012/0320212 A1* 12/2012 Aimura .............. G01C 21/3602
348/148
2013/0018547 A1* 1/2013 Ogata .................. G06V 20/584
348/148

FOREIGN PATENT DOCUMENTS

| CN | 102881186 A | 1/2013 |
|---|---|---|
| EP | 2015276 A2 | 1/2009 |
| JP | H07-160957 A | 6/1995 |
| JP | 2009-55553 A | 3/2009 |
| JP | 2011-146049 A | 7/2011 |
| JP | 2012-203884 A | 10/2012 |

* cited by examiner

WARNING DEVICE, WARNING METHOD, AND WARNING PROGRAM

CROSS REFERENCE TO RELATED APPLICATIONS

This application is a Continuation of U.S. patent application Ser. No. 16/591,537, filed on Oct. 2, 2019, which claims priority to U.S. patent application Ser. No. 15/698,099, filed on Sep. 7, 2017, which is a Bypass Continuation of International Application No. PCT/JP2016/001136, filed on Mar. 2, 2016, which is based upon and claims the benefit of priority from Japanese patent application No. 2015-046584 filed on Mar. 10, 2015 and Japanese patent application No. 2015-046585 filed on Mar. 10, 2015, the disclosures of which are incorporated herein in its entirety by reference.

BACKGROUND

The present invention relates to a warning device, a warning method, and a warning program.

An imaging device such as a digital camera generally takes an image of an area to be imaged by using a filter that transmits light with a specific wavelength. The imaging device can improve the image quality of an image taken by use of a filter that is suitable for the amount of light or the like of an area to be imaged. Thus, in the daytime with a large amount of visible light, a camera is used that employs a filter for daytime which transmits more light in the visible spectrum, and in the nighttime with a small amount of visible light, a camera is used that employs a filter for nighttime which transmits more light in the infrared spectrum.

Japanese Unexamined Patent Application Publication No. H07-160957 discloses a technique related to a monitoring device that includes an infrared sensor and a near-infrared camera. The monitoring device disclosed in Japanese Unexamined Patent Application Publication No. H07-160957 takes an image of an area monitored by the infrared sensor by using the near-infrared camera, and detects a change in the monitored area based on the image taken by the near-infrared camera. The monitoring device then determines an abnormal state based on the detected change and the output of the infrared sensor.

Recently, a warning device has been developed that takes an image of the area around a vehicle by using an in-vehicle camera, performs image recognition of the taken image and detects a person, a vehicle or the like as an object in the image, and issues a warning to a driver. Japanese Unexamined Patent Application Publication No. 2011-146049 discloses a technique related to a human detection device for detecting a person from a taken image. The human detection device disclosed in Japanese Unexamined Patent Application Publication No. 2011-146049 detects the appearance of an object based on an image acquired from an image sensor, determines whether a parameter related to the detected appearance of the object and a comparative parameter related to a human match or not, calculates a human probability indicating the probability that the object is a human according to the degree of matching, and determines that the object is a human when the human probability is equal to or more than a preset human threshold.

SUMMARY

In the case of the warning device described above, there are circumstances where it is difficult to determine the outside environment of a vehicle. The circumstances where it is difficult to determine the outside environment of a vehicle include the circumstances where weather conditions vary, the circumstances where a vehicle travels through a place where the surrounding brightness suddenly changes before and after entering a tunnel and the like. Therefore, there is a problem that it is sometimes difficult to issue a warning based on detection of an object under the circumstances where it is difficult to determine the outside environment of a vehicle.

Further, in the warning device described above, when an object exists in the traveling direction of a vehicle, it is necessary to issue a warning to a driver because there is a possibility of a collision. The possibility of a collision can be calculated by predicting the relative moving speed, the moving direction or the like of an object from analysis results of images taken in succession while a vehicle is traveling. However, the accuracy of detecting the movement of an object can decrease under the circumstances where it is difficult to determine the outside environment of a vehicle, and there is a problem that it is sometimes difficult to issue an appropriate warning.

Note that, in the monitoring device disclosed in Japanese Unexamined Patent Application Publication No. H07-160957, an area to be monitored is a specific area in facility, and it does not assume the circumstances where it is difficult to determine the outside environment. Further, in the human detection device disclosed in Japanese Unexamined Patent Application Publication No. 2011-146049, a target to be analyzed is a single image. Therefore, in the case where an appropriate filter cannot be used due to the circumstances where it is difficult to determine the outside environment, for example, the image quality is degraded. When the image quality of an image to be analyzed is low, the accuracy of detecting an object that can interfere with the traveling of a vehicle can decrease. This causes a failure to issue an appropriate warning. Further, such a problem occurs in a warning device that is mounted on movable bodies in general, not limited to vehicles.

A first aspect of the embodiment provides a warning device that includes at least one memory storing instructions, and a processor configured to execute the instructions to: acquire an image group including a plurality of images taken in succession; perform detection of an object on each of images in the image group; compare detection results of the object in the image group in chronological order and determine a degree of movement of the object; and issue a warning in accordance with the determined degree of movement, wherein the processor is further configured to execute the instructions to acquire a plurality of image groups respectively based on a plurality of filter characteristics and compare corresponding images between the plurality of image groups and thereby select an image with high detection accuracy for each time period, compare the selected images in chronological order, and determine the degree of movement of the object.

A second aspect of the embodiment provides a warning method that includes acquiring an image group including a plurality of images taken in succession; performing detection of an object on each of images in the image group; comparing detection results of the object in the image group in chronological order and determining a degree of movement of the object; and issuing a warning in accordance with the determined degree of movement, wherein the acquiring the image group acquires a plurality of image groups respectively based on a plurality of filter characteristics and the comparing the detection results compares corresponding images between the plurality of image groups and thereby selects an image with high detection accuracy for each time period, compares the selected images in chronological order, and determines the degree of movement of the object.

A third aspect of the embodiment provides a non-transitory computer readable medium storing a warning program that causes a computer to execute a processing of acquiring an image group including a plurality of images taken in succession; a processing of performing detection of an object on each of images in the image group; a processing of comparing detection results of the object in the image group in chronological order and determining a degree of movement of the object; and a processing of issuing a warning in accordance with the determined degree of movement, wherein the processing of acquiring the image group acquires a plurality of image groups respectively based on a plurality of filter characteristics and the processing of comparing the detection results compares corresponding images between the plurality of image groups and thereby selects an image with high detection accuracy for each time period, compares the selected images in chronological order, and determines the degree of movement of the object.

DETAILED DESCRIPTION

Specific exemplary embodiments of the present invention will be described hereinafter in detail with reference to the drawings. It is noted that in the description of the drawings, the same elements will be denoted by the same reference symbols and redundant description will be omitted to clarify the explanation.

First Embodiment of the Invention

Figure 1:
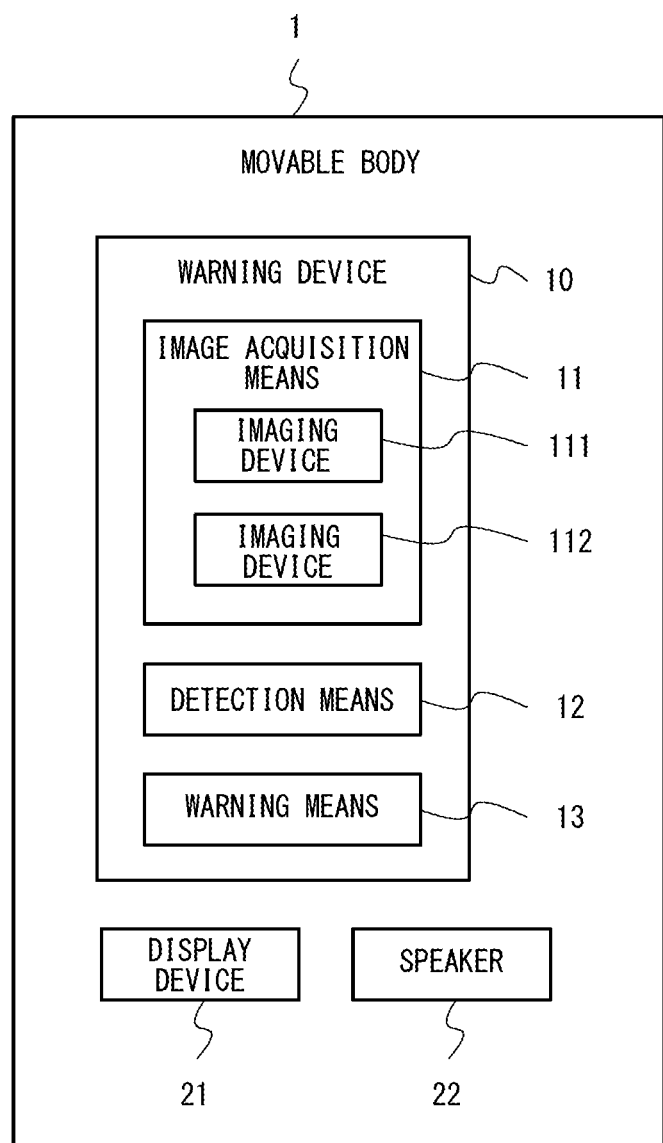
FIG. 1 is a block diagram showing the overall configuration of a movable body on which a warning device according to a first embodiment is mounted.

FIG. 1 is a block diagram showing the overall configuration of a movable body 1 on which a warning device 10 according to a first embodiment is mounted. The movable body 1 is equipped with the warning device 10, a display device 21, a speaker 22 and the like, and travels by operation of a driver. The movable body 1 is a vehicle such as an automobile, for example. The warning device 10 is a device that analyzes an image that is taken while the movable body 1 is traveling and thereby detects a nearby object that can collide with the movable body 1, and issues a warning to a driver through the display device 21, the speaker 22 or the like. Note that the display device 21 is an organic EL (electro-luminescence) display or a plasma display, for example.

The warning device 10 includes an image acquisition means 11, a detection means 12, and a warning means 13. The image acquisition means 11 takes images of the area around the movable body 1 by a plurality of different filter characteristics while the movable body 1 is traveling, and acquires them as a plurality of images. In other words, the image acquisition means 11 acquires a plurality of images based on the plurality of filter characteristics, respectively. The image acquisition means 11 includes imaging devices 111 and 112. The imaging devices 111 and 112 respectively correspond to the plurality of filter characteristics. Each of the imaging devices 111 and 112 takes images by the corresponding filter characteristics. Note that the number of imaging devices included in the image acquisition means 11 is not limited to two. For example, the image acquisition means 11 may include three or more imaging devices respectively corresponding to three or more filter characteristics. Note that the imaging device is a camera, for example.

The detection means 12 performs detection of a specified object on each of the plurality of acquired images. The detection of an object is the processing of trying to detect the appearance of an object by image recognition.

For example, there is a case where a person who is crossing a road is shown, together with the shape of the road, in an image taken by a camera in the traveling direction of a vehicle. In such a case, the area showing the appearance of the person who is crossing the road can be detected. The detection means 12 generates the detection result as an index value. Further, as described in Japanese Unexamined Patent Application Publication No. 2011-146049, the detection means 12 may detect a parameter related to the appearance of an object and generate the degree of matching between a comparative parameter and the detected parameter as a detection result. Note that the processing of generating a detection result when detecting an object from each image is not limited thereto. Further, the object is not limited to a human, and it includes any movable body that can interfere with the traveling of the movable body 1, such as an animal and another vehicle. Furthermore, the object is not necessarily a movable body, and it may be a person standing on the road, a stopped vehicle, a road closed sign, an obstacle left on the road and the like. Note that the parameter related to the appearance may be luminance, saturation, edge, or a combination of those.

The warning means 13 issues a specific warning when an object is detected from at least any one of the plurality of acquired images. Particularly, the warning means 13 according to an embodiment of the present invention issues a higher level of warning when an object is detected from all of the plurality of images than when an object is detected from only some of the plurality of images. Issuing a higher level of warning means changing the operation of a warning means so that an object is more clearly recognizable, as described later.

Figure 2:
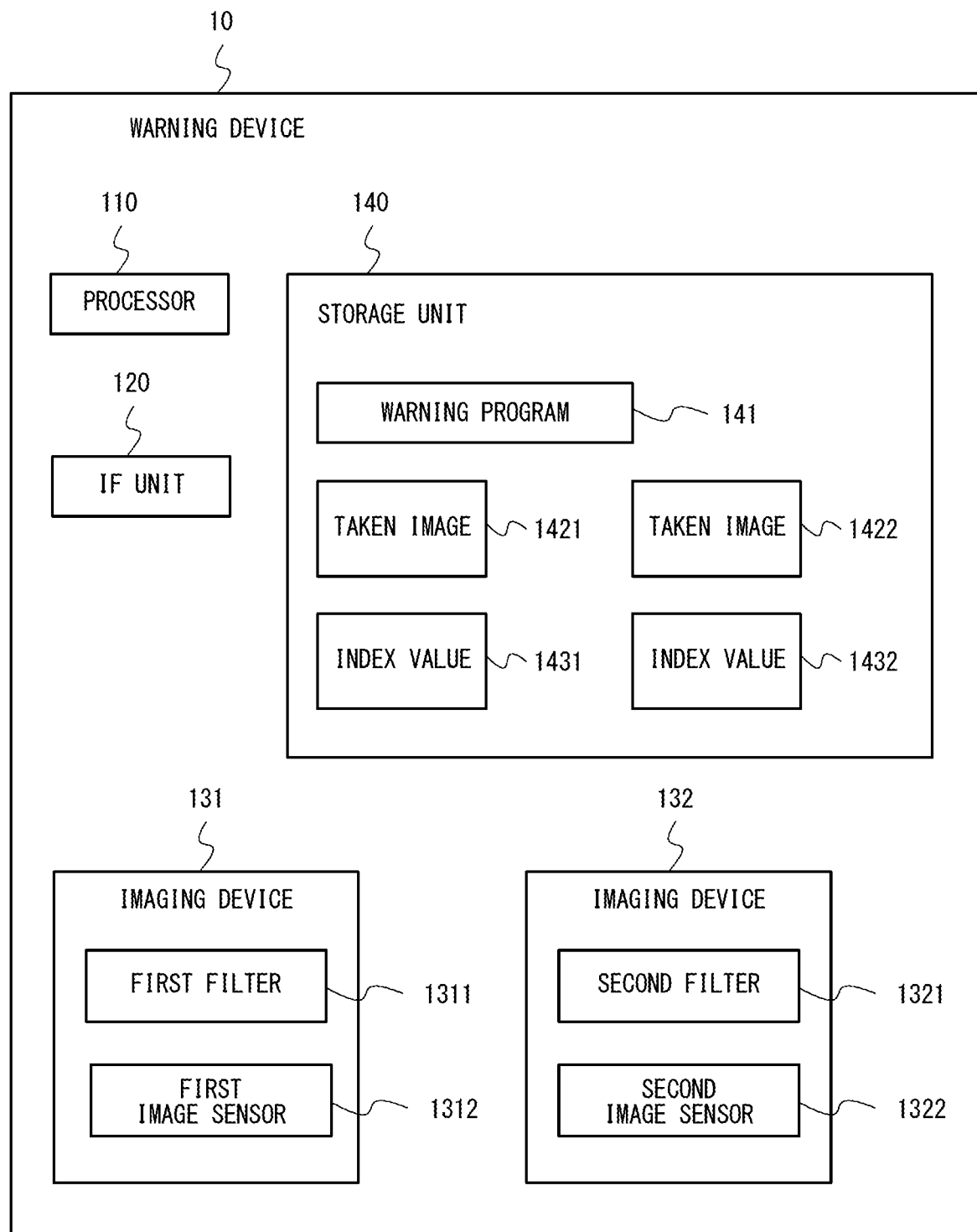
FIG. 2 is a block diagram showing the hardware configuration of the warning device according to the first embodiment.

FIG. 2 is a block diagram showing the hardware configuration of the warning device 10 according to the first embodiment. The warning device 10 includes a processor 110, an IF (InterFace) unit 120, imaging devices 131 and 132, and a storage unit 140.

The processor 110 is a control device such as a CPU (Central Processing Unit). The IF unit 120 is an interface for inputting and outputting data to and from the outside of the warning device 10. Particularly, the IF unit 120 outputs information indicating a warning to the display device 21 or the speaker 22 under control of the processor 110.

The imaging devices 131 and 132 respectively correspond to the imaging devices 111 and 112 described above. The imaging device 131 includes a first filter 1311 and a first image sensor 1312. The first filter 1311 makes selection of the wavelength of light to be incident on the first image sensor 1312. Thus, the first filter 1311 is a filter that is applied when taking an image by the imaging device 131. The first filter 1311 has the filter characteristics that block light in the near-infrared spectrum and transmit light in the visible spectrum, for example. It is assumed that the first filter 1311 is at least a filter that is suitable in the case where the area around the movable body 1 is bright such as during daytime hours. The first image sensor 1312 is an element that converts the intensity of light that has passed through the first filter 1311 into an electrical signal.

The imaging device 132 includes a second filter 1321 and a second image sensor 1322. The second filter 1321 makes selection of the wavelength of light to be incident on the second image sensor 1322. Thus, the second filter 1321 is a filter that is applied when taking an image by the imaging device 132. The second filter 1321 has the filter characteristics that block light in the visible spectrum and transmit light in the near-infrared spectrum, for example. It is assumed that the second filter 1321 is at least a filter that is suitable in the case where the area around the movable body 1 is dark such as during nighttime hours. The second image sensor 1322 is an element that converts the intensity of light that has passed through the second filter 1321 into an electrical signal.

The storage unit 140 is a storage device such as a memory or a hard disk, for example. The storage unit 140 stores a warning program 141, taken images 1421 and 1422, and index values 1431 and 1432. The warning program 141 is a computer program in which object detection and warning processing, which is a warning method, of the warning device 10 according to this embodiment is implemented.

The taken image 1421 is image data that is taken by the imaging device 131 with use of the first filter 1311 and the first image sensor 1312. The taken image 1422 is image data that is taken by the imaging device 132 with use of the second filter 1321 and the second image sensor 1322. The index value 1431 is a value indicating the level of detection of an object from the taken image 1421 by the detection means 12. The index value 1432 is a value indicating the level of detection of an object from the taken image 1422 by the detection means 12. The index values 1431 and 1432 are, in other words, index values of the accuracy of detecting an object when image recognition is performed on taken images.

The processor 110 reads the warning program 141 from the storage unit 140 and executes it. The warning device 10 thereby operates as the image acquisition means 11, the detection means 12, the warning means 13 and the like according to this embodiment by using the IF unit 120, the imaging devices 131 and 132 as appropriate.

Figure 3:
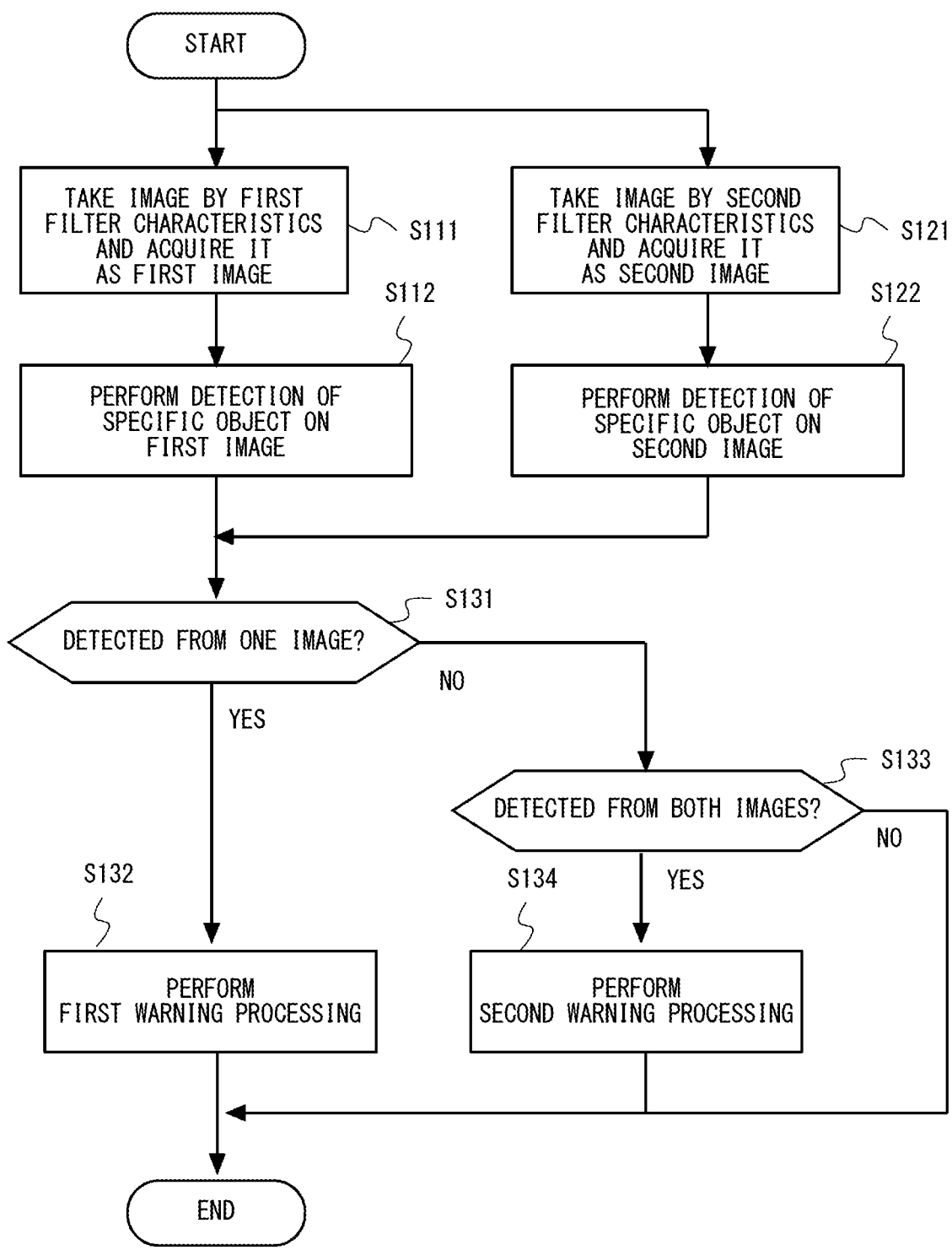
FIG. 3 is a flowchart illustrating the flow of an object detection and warning process according to the first embodiment.

FIG. 3 is a flowchart illustrating the flow of the object detection and warning process according to the first embodiment. It is assumed that it is in the early evening or the like, and the amount of light which is intermediate between the amount of light in the daytime and the amount of light in the nighttime is incident on the movable body 1.

Figure 4:
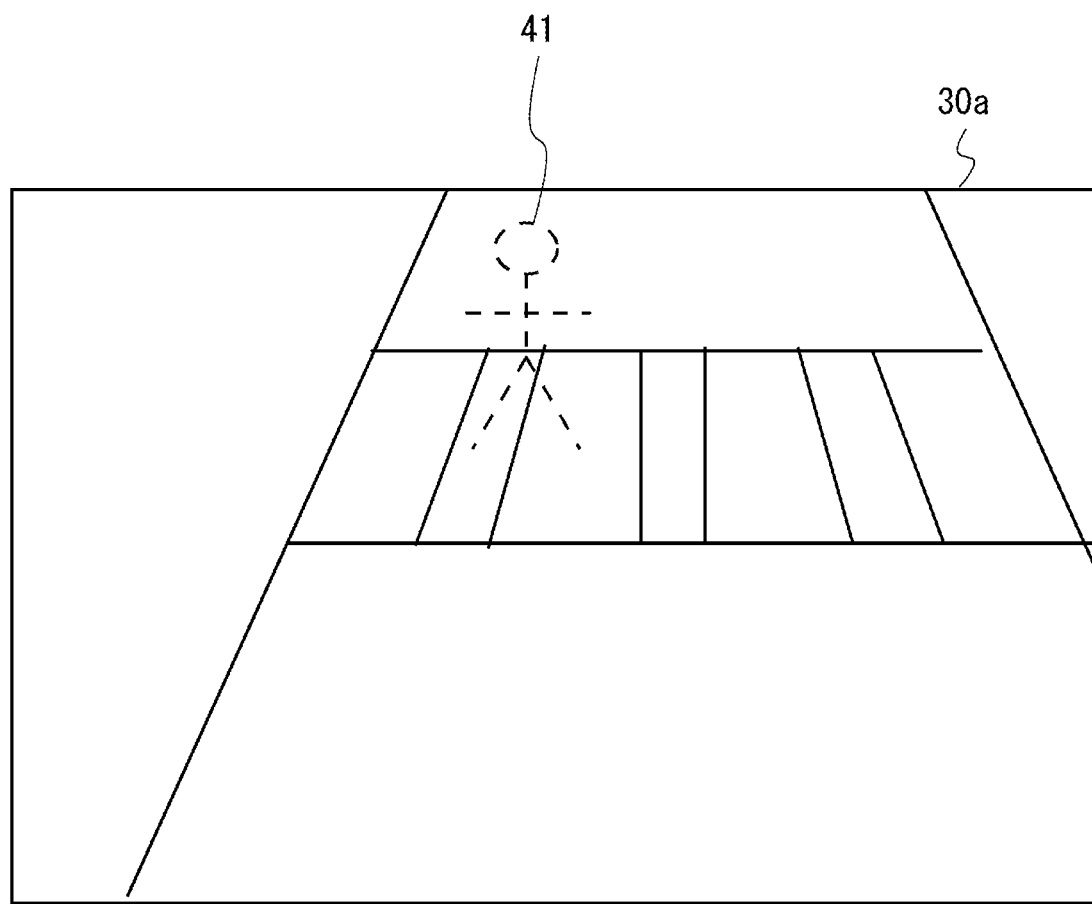
FIG. 4 is a view showing an example of an image taken by a first filter according to the first embodiment.

First, the imaging device 111 takes an image of the area around the movable body 1 by the first filter characteristics while the movable body 1 is traveling, and acquires it as a first image (S111). At this time, the warning device 10 stores the acquired first image into the storage unit 140. Then, the detection means 12 performs detection of a specified object on the first image (S112). FIG. 4 is a view showing an example of a taken image 30*a* by the first filter according to the first embodiment. It shows that, in the taken image 30*a*, an object 41 is detected to some degree in the traveling direction of the movable body 1. However, the detection means 12 cannot sufficiently identify the object 41.

Figure 5:
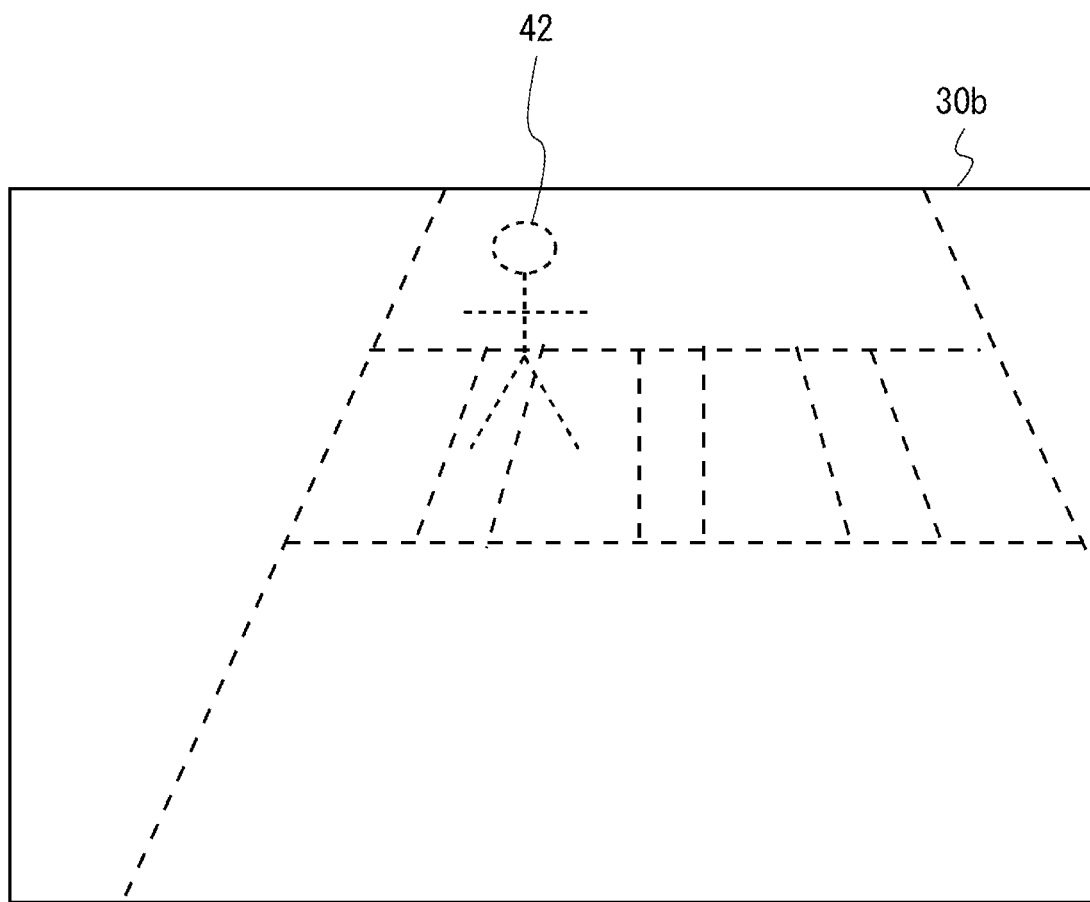
FIG. 5 is a view showing an example of an image taken by a second filter according to the first embodiment.

In parallel with Step S111, the imaging device 112 takes an image of the area around the movable body 1 by the second filter characteristics while the movable body 1 is traveling, and acquires it as a second image (S121). At this time, the warning device 10 stores the acquired second image into the storage unit 140. Then, the detection means 12 performs detection of a specified object on the second image (S122). FIG. 5 is a view showing an example of a taken image 30*b* by the second filter according to the first embodiment. It shows that, in the taken image 30*b*, an object 42 is slightly detected in the traveling direction of the movable body 1. However, because the taken image 30*b* is blurred, the detection means 12 cannot sufficiently distinguish the object 42 from the road.

After Steps S112 and S122, the warning means 13 determines whether an object is detected from one of the first image and the second image (S131). When an object is detected from one image, the warning means 13 performs first warning processing (S132). For example, the warning means 13 outputs the image from which the object is detected to the display device 21 and displays the image on the screen. For example, in the case where the amount of light in the outside environment is not sufficient, while an object is clearly shown in the first image, the object cannot be recognized and detected in the second image. In such a case, the warning means 13 outputs the first image to the display device 21. With the first image displayed on the screen, a driver can recognize the danger.

When the determination in Step S131 results in No, the warning means 13 determines whether an object is detected from both of the first image and the second image (S133). For example, in the case of the taken images 30a and 30b in FIGS. 4 and 5 described above, an object is detected from both images. In this case, the warning means 13 performs second warning processing (S134). The second warning processing issues a higher level of warning than the first warning in Step S132. The issuance of a higher level of warning is described hereinafter. For example, the warning means 13 outputs, to the display device 21, the first image in which the object is detected at higher accuracy among the first image and the second image, and displays it on the screen. At this time, the warning means 13 may modify the first image to highlight the area around the object in the first image and displays it on the display device 21. Note that, as described later, highlighting may be done by drawing a rectangle line around an object, placing a mark on or above an object, changing the color of an object or the like, for example. Alternatively, the warning means 13 may output a warning tone through the speaker 22, together with display on the basis of the first image. In sum, the warning means 13 issues a specific warning by using one of the first image and the second image in which the object is detected at higher accuracy.

On the other hand, the case where the level of warning is not high compared with the above (for example, when an object is detected from one of the first image and the second image) is also described as an example. In this case, one of the first image and the second image in which an object is shown is output to the display device 21 and displayed on the screen as described above. At this time, the warning means 13 performs processing such as displaying the first image on the display device 21 without any modification, or, when modifying the image and displaying it on the display device 21, performs processing such as drawing a thinner line around an object, placing a different mark above an object, or changing the color of an object to be modified compared with the case where the level of warning is high. Further, in the case where the warning means 13 outputs a warning tone through the speaker 22, it performs processing such as changing the volume or changing the warning tone compared with the case where the level of warning is high.

When the determination in Step S133 results in No, the process of FIG. 3 ends.

In Steps S112 and S122 in FIG. 3, the detection means 12 may calculate an index value indicating the level of detection of an object for each of the plurality of acquired images. For example, as described in Japanese Unexamined Patent Application Publication No. 2011-146049, the detection means 12 may detect a parameter related to the appearance of an object and calculate the degree of matching between a comparative parameter and the detected parameter as the index value. The parameter related to the appearance may be luminance, saturation, edge, or a combination of those. Note that the processing of calculating the index value when detecting an object from each image is not limited thereto.

Figure 6:
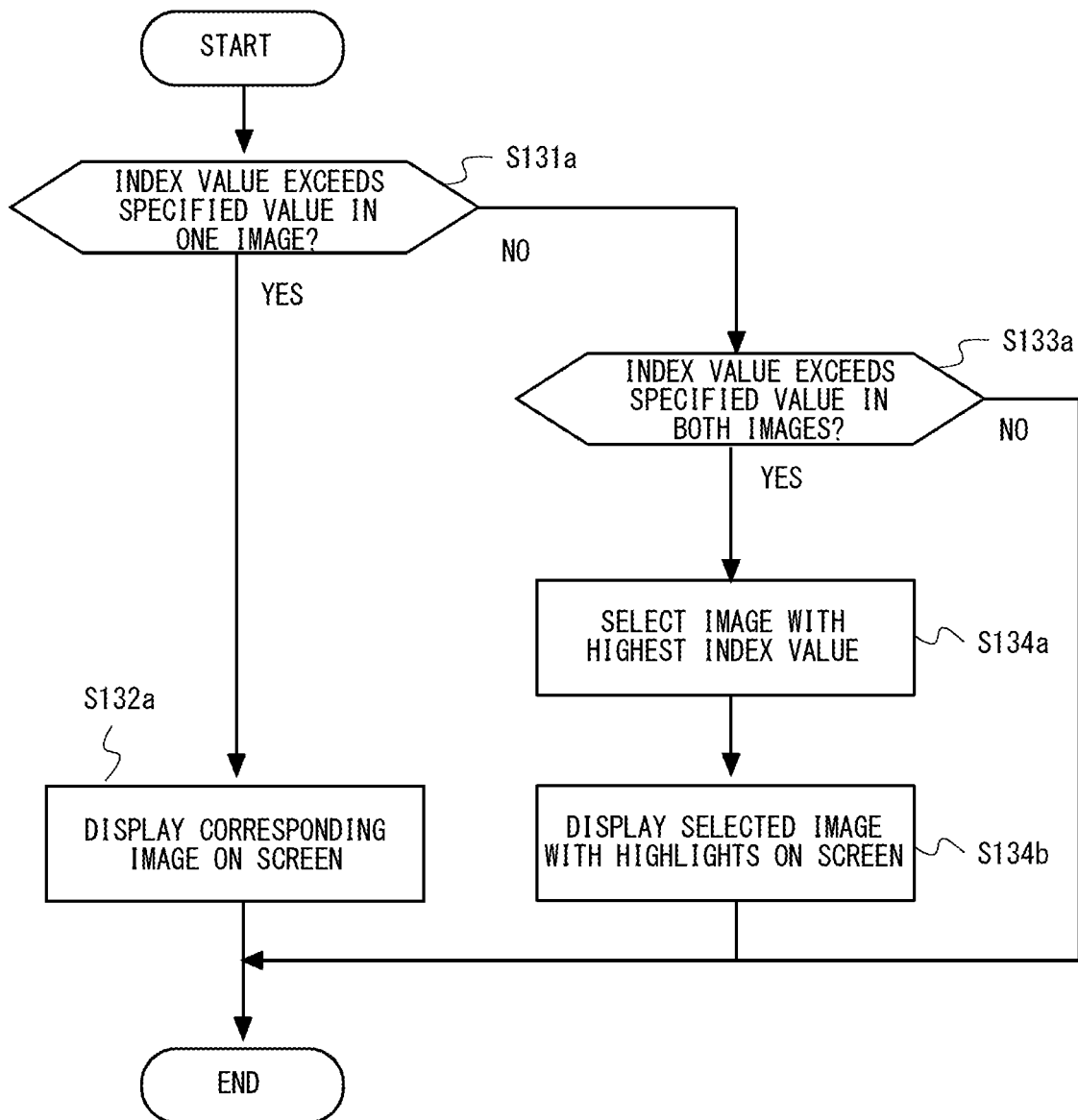
FIG. 6 is a flowchart illustrating the flow of an example of a warning process according to the first embodiment.

Then, the detection means 12 stores the calculated index values into the storage unit 140. An example of warning processing from Steps S131 to S134 in FIG. 3 in this case is described hereinafter with reference to FIG. 6.

First, the warning means 13 determines whether the index value exceeds a specified value in one image or not (S131a). For example, the warning means 13 determines whether the index value 1431 read from the storage unit 140 exceeds a specified value is one or not. Likewise, the warning means 13 determines whether the index value 1432 read from the storage unit 140 exceeds a specified value is one or not. When one of the index values 1431 and 1432 exceeds a specified value and the other one of them falls below the specified value, the warning means 13 displays the corresponding image, which is the image in which the index value exceeds the specified value, on the screen (S132a). Step S132a is one example of first warning processing.

Figure 7:
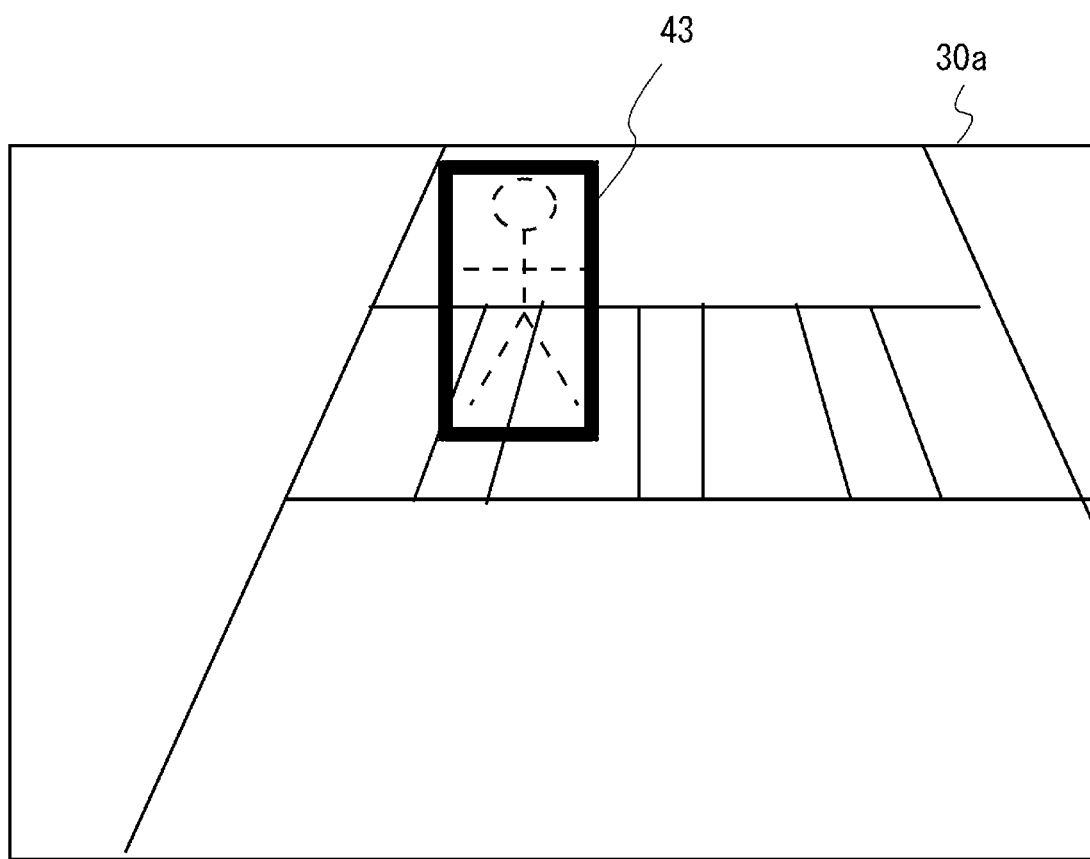
FIG. 7 is a view showing an example of displaying an image with the position of an object highlighted according to the first embodiment.

When the determination in Step S131a results in No, the warning means 13 determines whether the index value exceeds a specified value in both images or not (S133a). When the index value exceeds a specified value in both images, the warning means 13 selects the image with the highest index value (S134a). For example, in the case of the taken images 30a and 30b, the taken image 30a is selected. Then, the warning means 13 displays, on the screen, the selected image with the object highlighted (S134b). For example, the warning means 13 generates an image in which a line is drawn around the area of the object 41 in the taken image 30a, outputs the image to the display device 21 and displays it on the screen. FIG. 7 is a view showing an example of displaying an image with the position of an object highlighted according to the first embodiment. A highlighted display area 43 in the taken image 30a is one example of highlighting. Note that, however, highlighting is not limited thereto. When the determination in Step S133a results in No, the process of FIG. 6 ends.

As described above, the first embodiment has the following advantages.

First, in the case of taking an image by using any one of two filter characteristics as before, it is possible to detect an object with high accuracy by use of appropriate filter characteristics for the outside environment. However, the accuracy of detecting an object is degraded if inappropriate filter characteristics are used. Further, when a movable body is traveling, the circumstances where it is difficult to determine the outside environment can occur. Therefore, in the first embodiment, images of the surrounding area are taken by using each of a plurality of filter characteristics, thereby increasing the probability of detecting an object from at least any one of the images. It is thus possible to issue a warning to a driver about a dangerous situation in more cases and thereby enhance the safety.

An example of the circumstances where it is difficult to determine the outside environment is the early evening when it is difficult to distinguish between the daytime and the nighttime from the amount of light. In such circumstances, each of the images taken by use of a filter for daytime and a filter for nighttime does not have sufficient quality, and there is a possibility that accurate detection cannot be achieved by analyzing a single image only. Thus, in the first embodiment, it is determined as a dangerous situation when an object is detected at a certain level of accuracy from each of a plurality of images obtained by taking the same object by a plurality of different filter characteristics. Particularly, in such circumstances, a driver is likely to have difficulty recognizing an object compared with the case where it is clearly daytime or nighttime. Therefore, the level of warning is increased in such circumstances, and it is thereby possible to issue an appropriate warning to a driver.

Further, in the case of second warning processing in which the level of warning is higher than in first warning processing, one of two images in which an object is detected at higher accuracy is used. This is because, when an object is detected from two or more taken images, a warning is issued with use of the image with higher detection accuracy, so that a driver can more easily recognize the object.

Second Embodiment of the Invention

Figure 8:
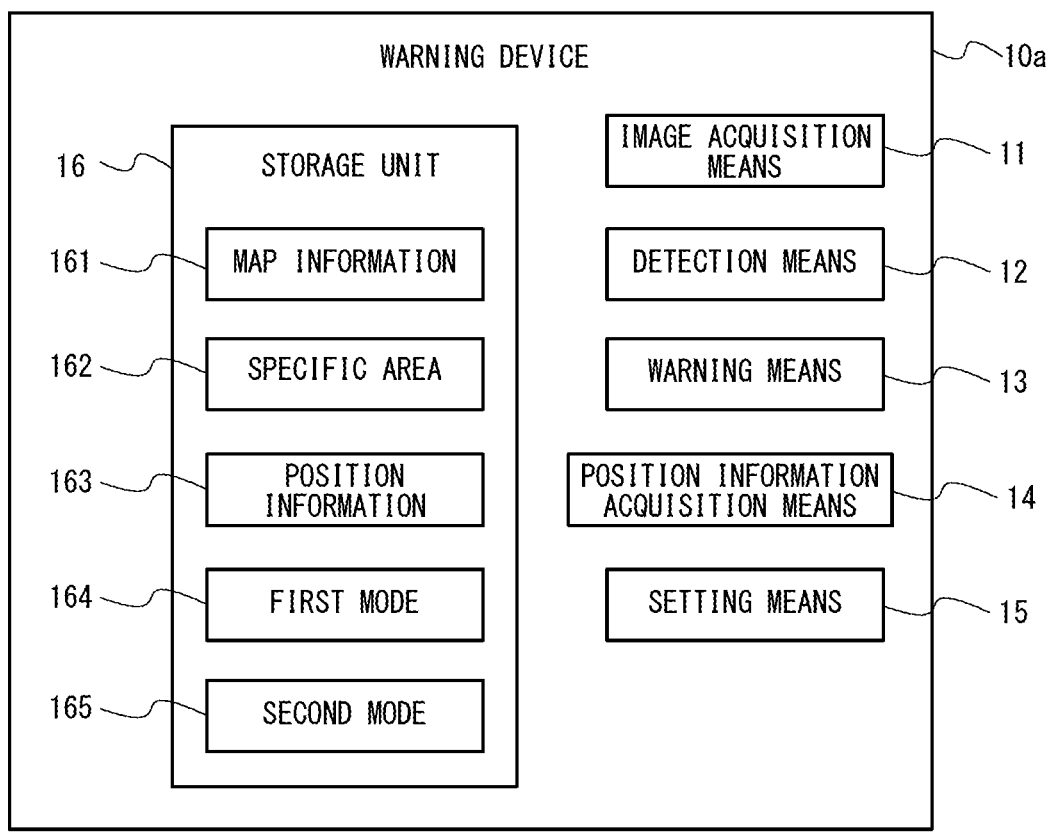
FIG. 8 is a block diagram showing the configuration of a warning device according to a second embodiment.

A second embodiment is a modified example of the first embodiment described above. FIG. 8 is a block diagram showing the configuration of a warning device 10a according to the second embodiment. The warning device 10a includes a position information acquisition means 14 and a setting means 15 in addition to the elements of the warning device 10 shown in FIG. 1. Therefore, the same elements as those in FIG. 1 are not redundantly described below. Further, for the convenience of description, a storage unit 16, which corresponds to the storage unit 140 in FIG. 2, is shown in FIG. 8. It is assumed that functions corresponding to those described in the second embodiment are also implemented in the warning program 141.

The storage unit 16 further includes map information 161, specific area 162, position information 163, first mode 164 and second mode 165, in addition to the elements in the storage unit 140 of FIG. 2. The map information 161 is information that defines, by coordinates, the positions of roads on which a vehicle travels and facilities. Note that the map information 161 may be the one used in a general car navigation system. The specific area 162 is information that defines a partial area in the map information 161 in advance. The specific area 162 indicates an area on an expressway, on a local street, inside a tunnel, near a train station or the like. The position information 163 is the current position information of the movable body 1 that is acquired by the position information acquisition means 14.

The first mode 164 is setting information that defines that the image acquisition means 11 takes an image by one filter characteristics. The second mode 165 is setting information that defines that the image acquisition means 11 takes an image by a plurality of filter characteristics.

The position information acquisition means 14 acquires the current position information of the movable body 1 at regular intervals. The position information acquisition means 14 then stores the acquired position information into the storage unit 16. The position information acquisition means 14 is a device that is mounted on a vehicle and can acquire GPS (Global Positioning System) information, for example.

The setting means 15 selects the first mode 164 or the second mode 165 according to specified conditions, and sets the selected mode to the image acquisition means 11. Further, when the acquired position information 163 is within the range of the specific area 162 on the map information 161, the setting means 15 selects the second mode 165 and sets it to the image acquisition means 11.

The specified conditions are conditions using some or all of position information, time information, weather, road information, driving information and the like, for example. An example of the conditions using position information is whether the distance between the current position and a specific position is within a specified value or not, or whether it is within the range of a specific area or not. An example of the conditions using time information is conditions for determining a season based on the present day of month, or conditions for determining a time period such as the daytime, the nighttime or the evening based on hours and minutes. To use the time information, it is necessary to add an element for acquiring information about the current time or the like.

An example of the conditions using the weather is the state of clouds, whether the weather is sunny, cloudy, rainy or the like. To use the weather, it is necessary to add an element for acquiring information about the weather or the like. An example of the conditions using road information is conditions for determining whether a road type is an expressway or a local street, the width of road, a road sign, a road shape, a road surface condition or the like. To use the road information, it is necessary to add an element for acquiring information about the road on which a vehicle is traveling or the like. An example of the conditions using driving information is conditions for determining whether vehicle speed, brake control information or the like exceeds a specified value or not. To use the driving information, it is necessary to add an element for acquiring speed or brake control information from a vehicle or the like.

Figure 9:
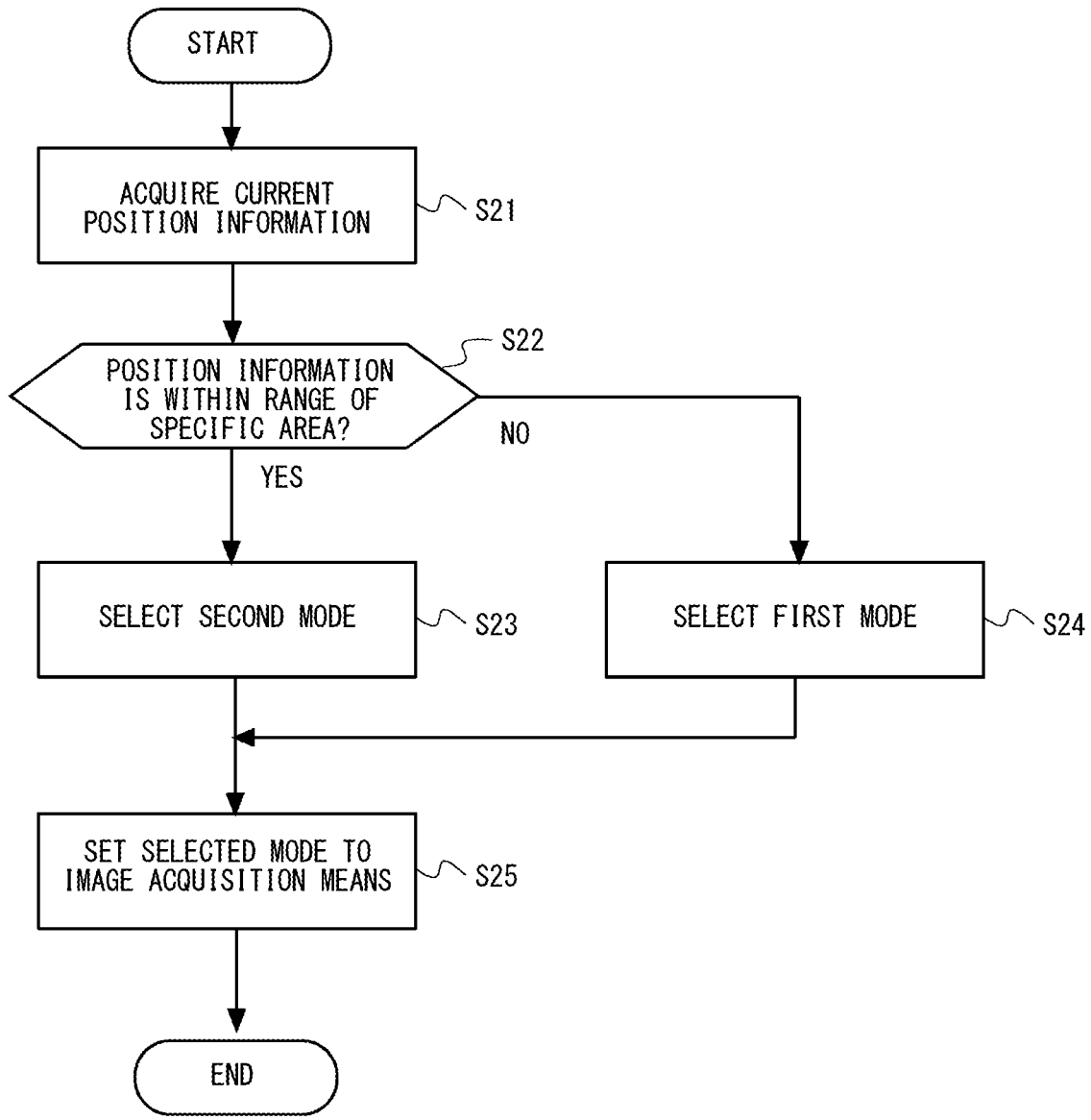
FIG. 9 is a flowchart illustrating the flow of a mode setting process according to the second embodiment.

FIG. 9 is a flowchart illustrating the flow of a mode setting process according to the second embodiment. First, the position information acquisition means 14 acquires the current position information on a regular basis (S21). Next, the setting means 15 determines whether the acquired position information is within the range of the specific area or not (S22). When it is determined that the acquired position information is within the range of the specific area, the setting means 15 selects the second mode (S23). On the other hand, when it is determined that the acquired position information is outside the range of the specific area, the setting means 15 selects the first mode (S24). After that, the setting means 15 sets the selected mode to the image acquisition means 11 (S25).

As described above, in the second embodiment, it is possible to change the type of a filter to be used for taking an image according to situations. Thus, when it is easy to determine the outside environment, it is possible to use the first mode to reduce the power consumption or the like of the movable body 1. On the other hand, when it is difficult to determine the outside environment, it is possible to immediately change the mode to the second mode using a plurality of filter characteristics.

Third Embodiment of the Invention

A third embodiment is a modified example of the first embodiment described above. While the image acquisition means 11 includes two imaging devices in the first embodiment described above, an image acquisition means 11a according to the third embodiment includes one imaging device.

Figure 10:
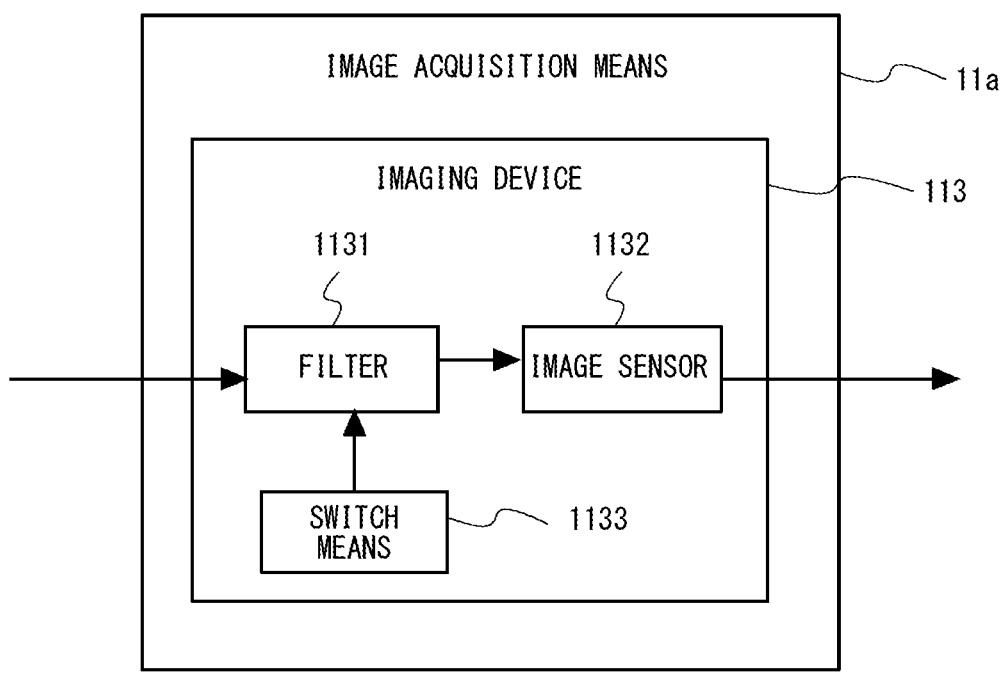
FIG. 10 is a block diagram showing the configuration of an image acquisition means according to a third embodiment.

FIG. 10 is a block diagram showing the configuration of the image acquisition means 11a according to the third embodiment. The image acquisition means 11a includes one imaging device 113. The imaging device 113 takes images by switching a plurality of filter characteristics on a regular basis. The imaging device 113 includes a filter 1131, an image sensor 1132 and a switch means 1133. The filter 1131 makes selection of the wavelength of light to be incident on the image sensor 1132. For example, the filter 1131 selects and transmits light in the visible spectrum and light in the near-infrared spectrum to be incident on the image sensor 1132. Note that the filter 1131 may include an infrared cut filter (IR filter), a high-pass filter, a band-pass filter and the like. Accordingly, the filter 1131 can implement certain filter characteristics selected from a plurality of types of filter characteristics. The image sensor 1132 is an element that converts the intensity of light that has passed through the filter 1131 into an electrical signal. The switch means 1133 sets the selected filter characteristics to the filter 1131. The switch means 1133 then switches the selection of filter characteristics at regular intervals. Note that, it is assumed that the switch means 1133 switches the filter characteristics at a speed which is substantially equal to that when a plurality of imaging devices take images of the same object, at the same time, by a plurality of filter characteristics. The switching and image taking are done on a regular basis by the switch means having a clock or receiving a clock signal.

As described above, the same advantages as in the first embodiment described above can be obtained also in the third embodiment.

Fourth Embodiment of the Invention

Figure 11:
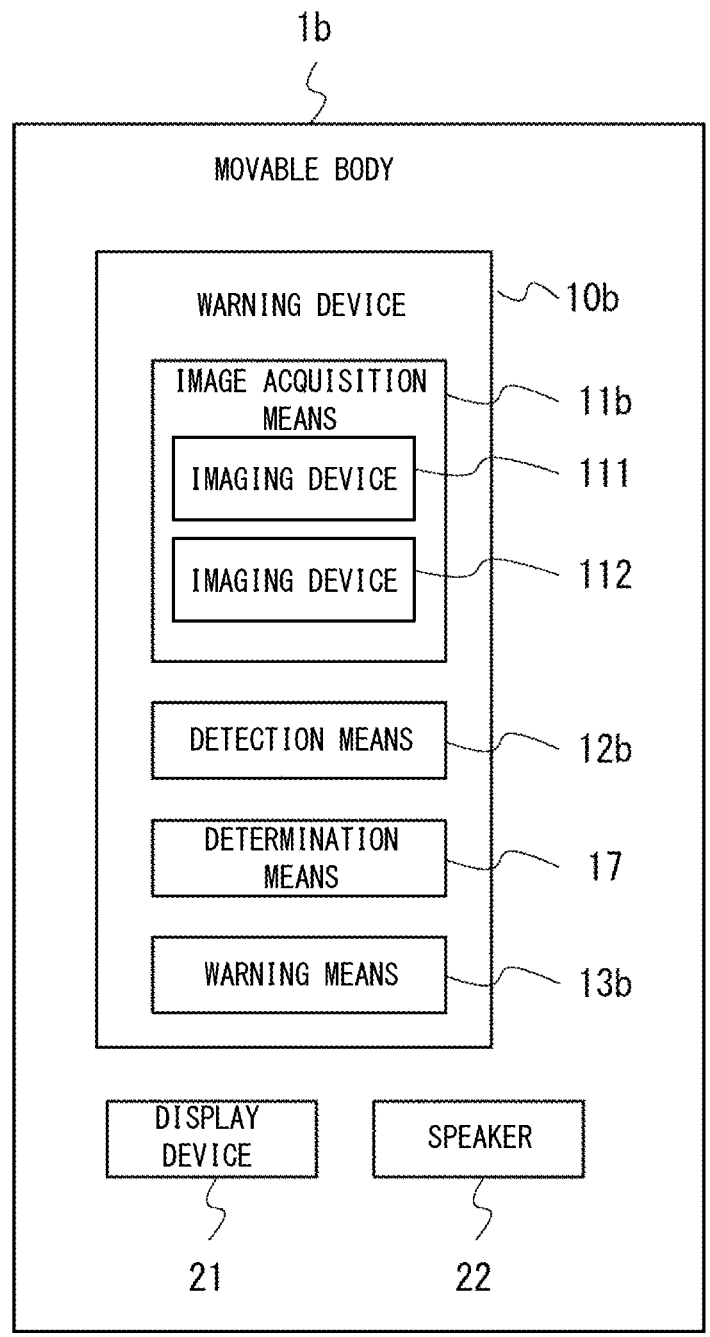
FIG. 11 is a block diagram showing the overall configuration of a movable body on which a warning device according to a fourth embodiment is mounted.

FIG. 11 is a block diagram showing the overall configuration of a movable body 1b on which a warning device 10b according to a fourth embodiment is mounted. The movable body 1b is equipped with the warning device 10b, a display device 21, a speaker 22 and the like, and travels by operation of a driver. The movable body 1b is a vehicle such as an automobile, for example. The warning device 10b is a device that analyzes an image that is taken while the movable body 1b is traveling and thereby detects a nearby object that can collide with the movable body 1b, and issues a warning to a driver through the display device 21, the speaker 22 or the like. Note that the display device 21 and the speaker 22 are the same as those of FIG. 1.

The warning device 10b includes an image acquisition means 11b, a detection means 12b, a determination means 17, and a warning means 13b. The image acquisition means 11b takes images of the area around the movable body 1b successively in parallel by a plurality of different filter characteristics while the movable body 1b is traveling. The image acquisition means 11b then acquires the plurality of taken images as a plurality of time-series image groups for each of the filter characteristics. Stated differently, the image acquisition means 11b acquires an image group including a plurality of images taken in succession. Then, the image acquisition means 11b acquires a plurality of image groups based on the plurality of filter characteristics, respectively. The image acquisition means 11b includes imaging devices 111 and 112. The imaging devices 111 and 112 respectively correspond to the plurality of filter characteristics. Each of the imaging devices 111 and 112 takes images by the corresponding filter characteristics. Note that the number of imaging devices included in the image acquisition means 11b is not limited to two. For example, the image acquisition means 11b may include three or more imaging devices respectively corresponding to three or more filter characteristics. Note that the imaging device is a camera, for example.

The detection means 12b performs detection of a specified object on each of images in the plurality of image groups. The detection means 12b then generates a detection result for each image. Note that a method of detecting an object in one image by the detection means 12b is the same as the method by the detection means 12 described above.

The determination means 17 compares object detection results in a plurality of image groups in chronological order, and determines the degree of movement of an object. "Comparing detection results in chronological order" means comparing detection results in images taken at the times adjacent to each other. At this time, detection results may be compared between images in each image group, or between images belonging to different image groups. Alternatively, detection results may be compared between images belonging to different image groups and taken at the same time. Further, an average of detection results between images belonging to different image groups and taken at a certain time may be calculated, and an average between images taken at an adjacent time may be compared.

Further, "the degree of movement" includes the degree indicating whether an object is moving closer to or farther from the movable body 1b, which is, the degree of approach or the speed of approach of an object to the movable body 1b, the speed of movement or the direction of movement of an object and the like, for example. Further, "determining the degree of movement of an object" includes determining whether the speed of approach or the like is higher than a reference value, for example. Alternatively, when an object moves crossing a road, the probability of a collision between the object and the movable body 1b may be calculated from the moving direction and the moving speed, the traveling direction and the traveling speed of the movable body 1b, and whether the probability of a collision exceeds a reference value or not may be determined, for example.

The warning means 13b issues a warning in accordance with the determined degree of movement. For example, the warning means 13b issues a warning when an object is approaching the movable body 1b from the degree of movement. Particularly, the warning means 13b issues a higher level of warning when the degree of approach exceeds a reference value. Further, the warning means 13b issues a higher level of warning also when the probability of a collision exceeds a reference value as described above.

Figure 12:
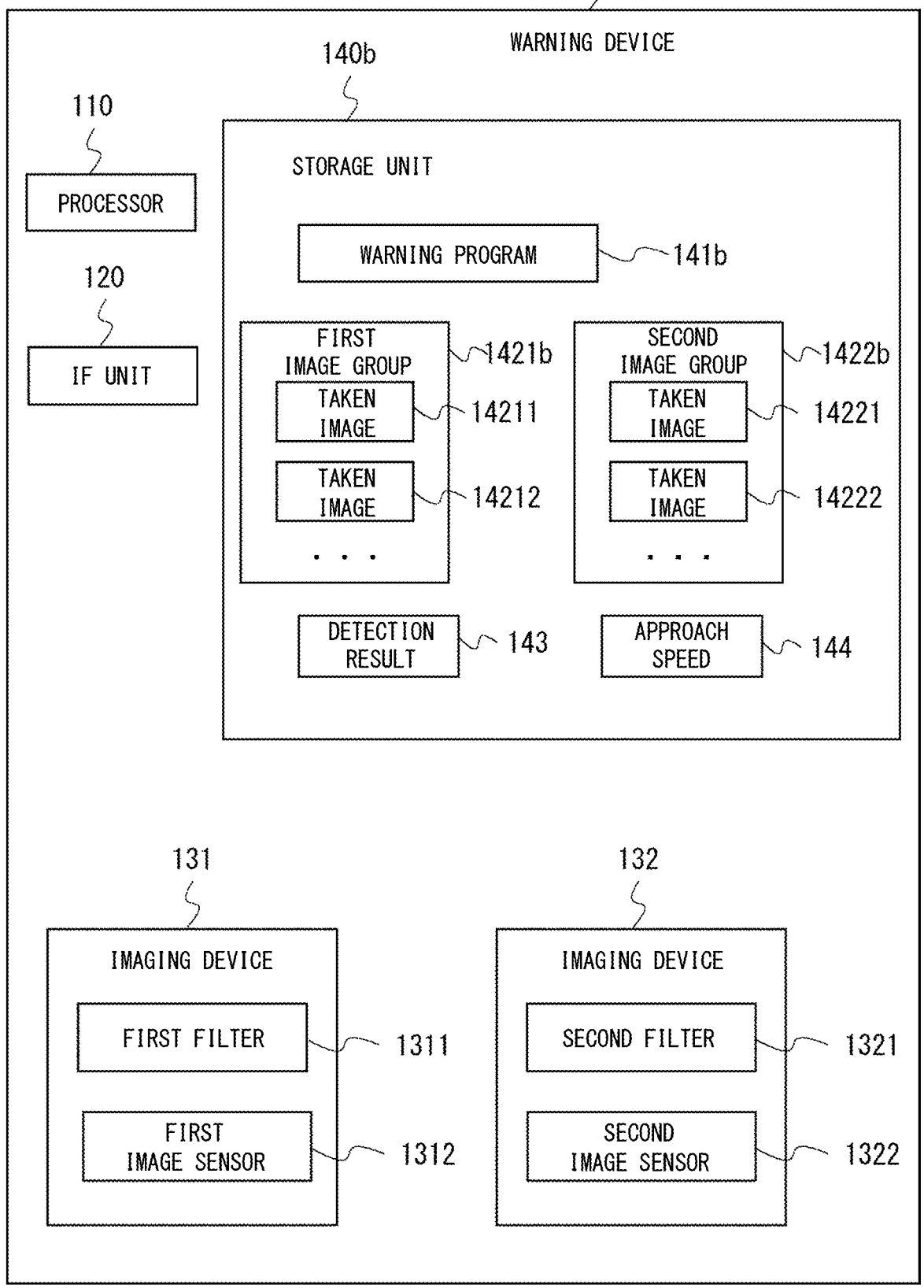
FIG. 12 is a block diagram showing the hardware configuration of the warning device according to the fourth embodiment.

FIG. 12 is a block diagram showing the hardware configuration of the warning device 10b according to the fourth embodiment. The warning device 10b includes a processor 110, an IF unit 120, imaging devices 131 and 132, and a storage unit 140b. The processor 110, the IF unit 120, the imaging devices 131 and 132 are the same as those in FIG. 2, and detailed description thereof is omitted.

The storage unit 140b is a storage device such as a memory. The storage unit 140b stores a warning program 141b, a first image group 1421b, a second image group 1422b, a detection result 143 and an approach speed 144. The warning program 141b is a computer program in which processing, which is a warning method, of the warning device 10b according to the fourth embodiment is implemented.

The first image group 1421b is a time-series set of a plurality of taken images 14211, 14212, ... that are obtained by taking images of the area around the movable body 1 in succession by the first filter characteristics while the movable body 1b is traveling. It is assumed that the images 14211, 14212, ... are taken successively in this order, for example. Further, the second image group 1422b is a time-series set of a plurality of taken images 14221, 14222, ... that are obtained by taking images of the area around the movable body 1 in succession by the second filter characteristics, in parallel with taking images in the first image group 1421b. It is assumed that the images 14221, 14222, ... are taken successively in this order, for example. In sum, the images 14211 and the 14221 are taken at the corresponding time, and the images 14212 and the 14222 are taken at the corresponding time.

The detection result 143 is a result of trying to detect an object in each of the taken images. The detection result 143 exists for each taken image. The approach speed 144 is one example of the degree of approach of an object to the movable body 1b, and it is a relative moving speed of an object to the movable body 1b. The approach speed 144 is calculated from detection results in a plurality of images or the like in consideration of the time the images are taken.

The processor 110 reads the warning program 141*b* from the storage unit 140*b* and executes it. The warning device 10*b* thereby operates as the image acquisition means 11*b*, the detection means 12*b*, the determination means 17, the warning means 13*b* and the like according to the fourth embodiment by using the IF unit 120, the imaging devices 131 and 132 as appropriate.

Figure 13:
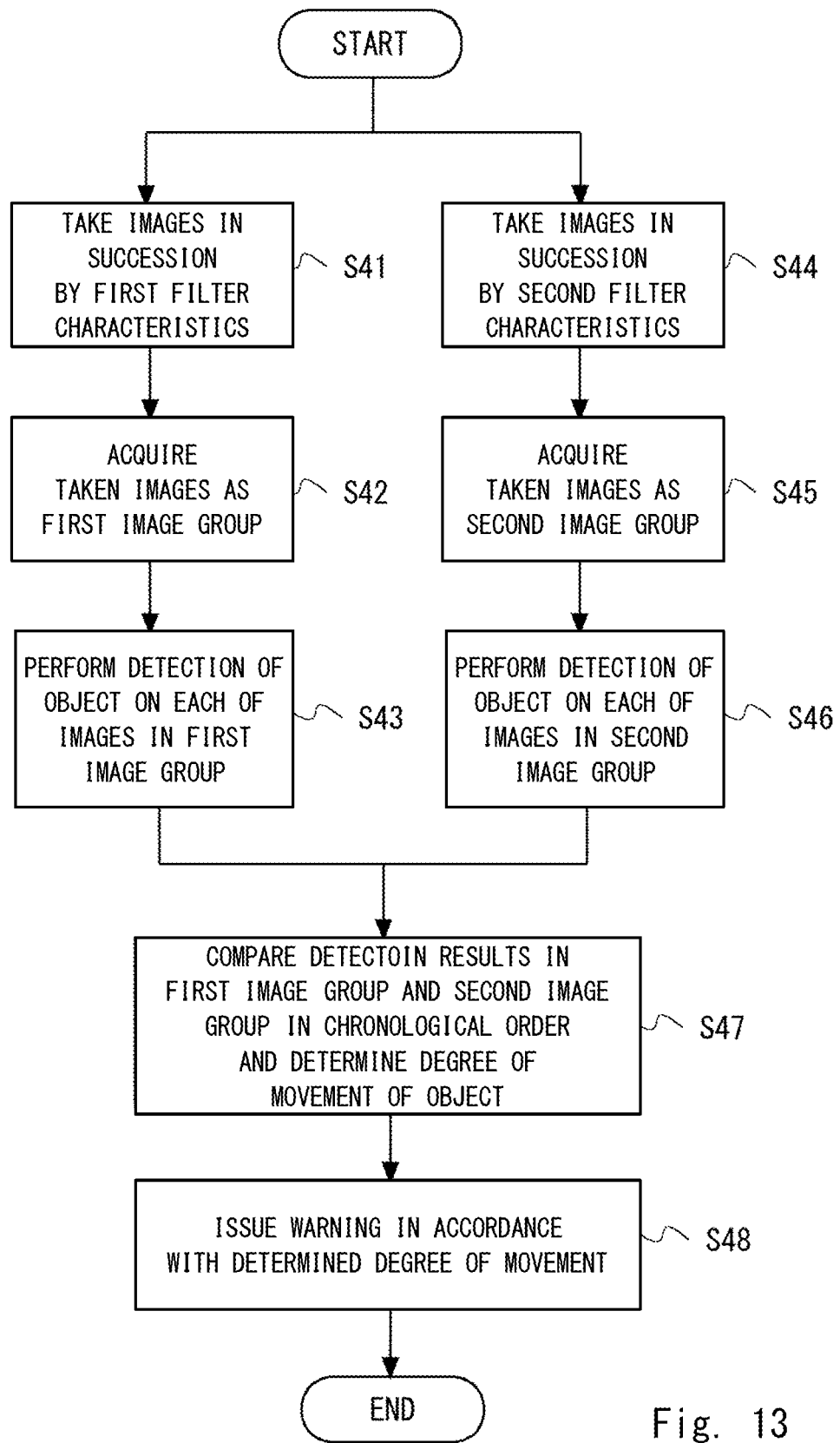
FIG. 13 is a flowchart illustrating the flow of a process from taking an image to issuing a warning according to the fourth embodiment.

FIG. 13 is a flowchart illustrating the flow of a process from taking an image to issuing a warning according to the fourth embodiment. First, the imaging device 111 takes images of the area around the movable body 1*b* in succession by the first filter characteristics while the movable body 1*b* is traveling (S41). The image acquisition means 11*b* then acquires the taken images as the first image group (S42). To be specific, each time an image is taken, the image acquisition means 11*b* stores the taken image in association with the first image group 1421*b* in the storage unit 140*b*. Then, the detection means 12*b* performs detection of a specified object on each image in the first image group (S43). To be specific, the detection means 12*b* reads the taken image 14211 or the like that is associated with the first image group 1421*b* stored in the storage unit 140*b*, performs detection for each image, and stores a detection result into the storage unit 140*b*.

Further, in parallel with Step S41, the imaging device 112 takes images of the area around the movable body 1*b* in succession by the second filter characteristics while the movable body 1*b* is traveling (S44). The image acquisition means 11*b* then acquires the taken images as the second image group (S45). To be specific, each time an image is taken, the image acquisition means 11*b* stores the taken image in association with the second image group 1422*b* in the storage unit 140*b*. Then, the detection means 12*b* performs detection of a specified object on each image in the second image group (S46). To be specific, the detection means 12*b* reads the taken image 14221 or the like that is associated with the second image group 1422*b* stored in the storage unit 140*b*, performs detection for each image, and stores a detection result into the storage unit 140*b*. Note that the detection means 12*b* may perform the detection processing in Steps S43 and S46 each time images are taken by the imaging devices 111 and 112.

After that, the determination means 17 compares detection results in the first image group and the second image group in chronological order, and determines the degree of movement of the object (S47). For example, the determination means 17 calculates the speed of approach of the object to the movable body 1*b* based on the detection results, and determines the degree of movement of the object by using the speed of approach. Then, the warning means 13*b* issues a warning in accordance with the determined degree of movement (S48).

As described above, in the fourth embodiment, while the movable body 1*b* is traveling, images of the area around the movable body 1*b* are taken in succession in parallel by a plurality of filter characteristics. At this time, the taken images are sorted, in chronological order, into different image groups corresponding to different filter characteristics. In the images taken by a plurality of filter characteristics, it is likely that the quality of an image taken by at least one of the filter characteristics in each time period attains the quality equivalent to an image taken by appropriate filter characteristics even under the circumstances where it is difficult to determine the outside environment of the movable body 1*b*. Therefore, by comparing object detection results on each of the images in chronological order, it is possible to determine the degree of movement of an object. It is thereby possible to issue an appropriate warning to a driver in accordance with the degree of movement of an object. This enhances the safety.

Particularly, by determining the degree of movement with use of the speed of approach, it is possible to make a determination about the danger of a collision more directly, which improves the accuracy of warning as well.

Examples 1 to 3 that show the detailed processing of Steps S47 and S48 in FIG. 13 described above are described hereinbelow.

Example 1

Figure 14:
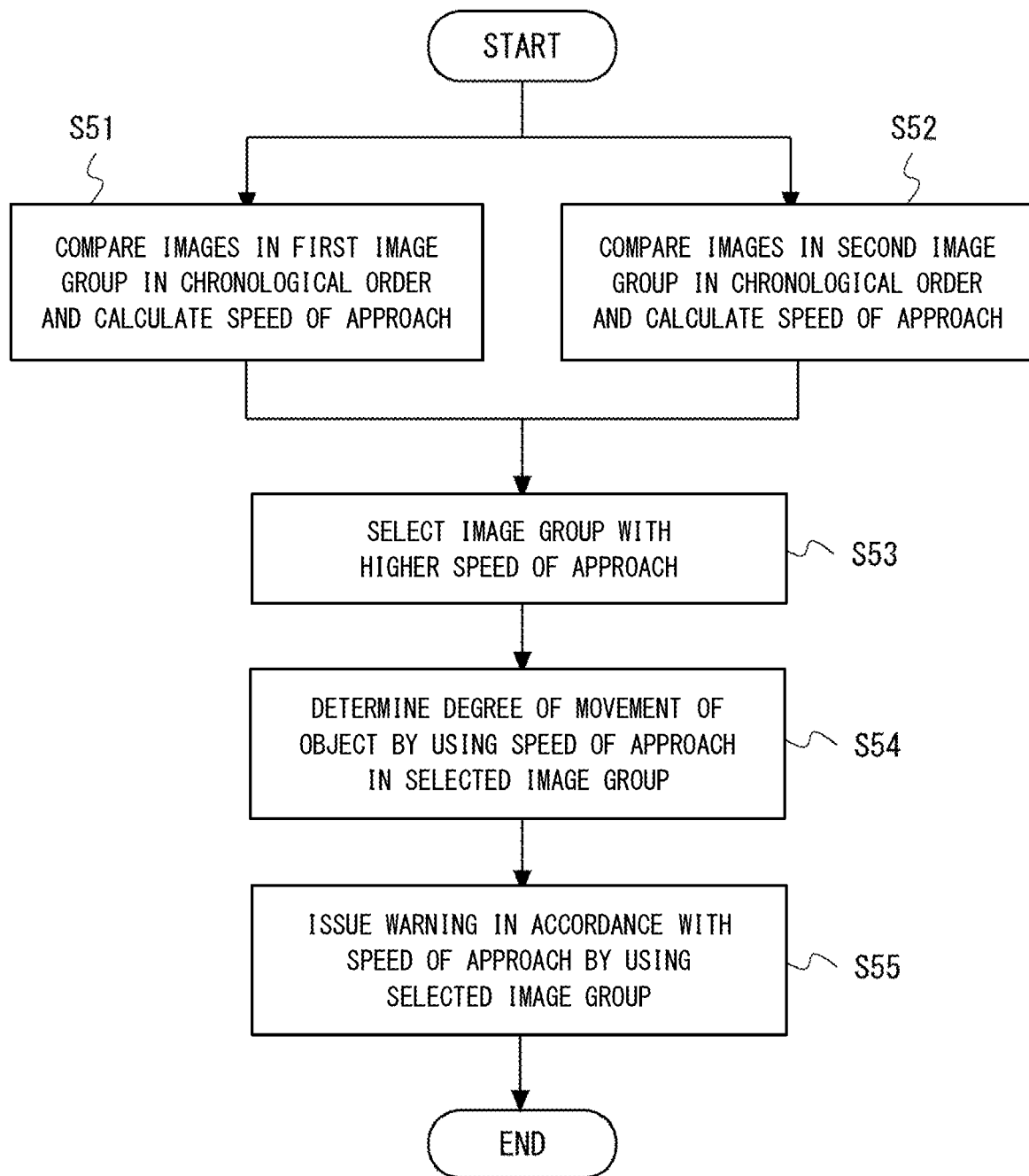
FIG. 14 is a flowchart illustrating the flow of a detailed process in an example 1 of the fourth embodiment.
Figure 15:
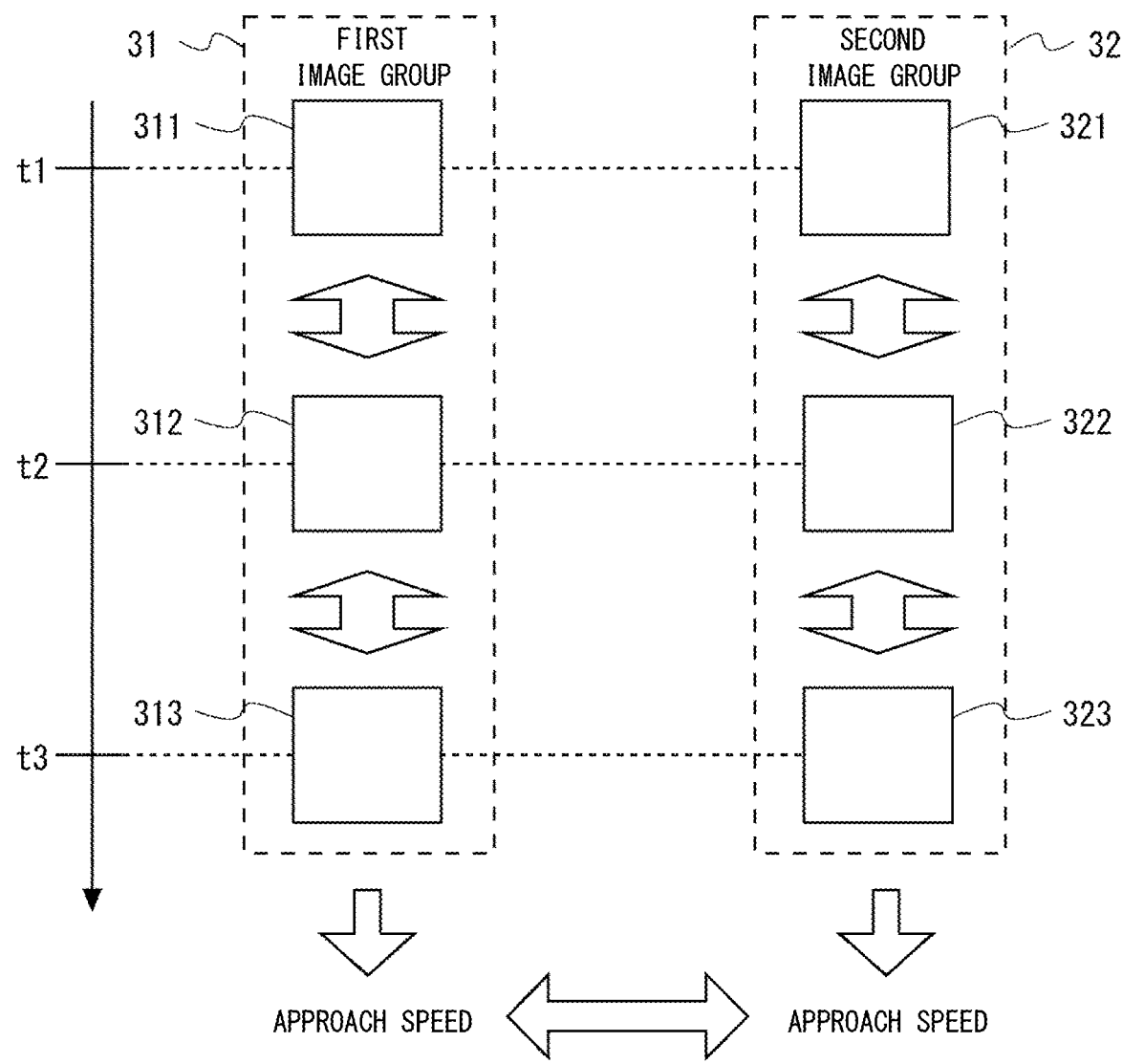
FIG. 15 is a view illustrating the concept of processing in the example 1 of the fourth embodiment.

In the example 1, the speed of approach is calculated for each image group, and a warning is issued based on the image group with a higher speed of approach. Processing of the example 1 is described hereinafter with reference to FIG. 14, and with reference also to FIG. 15 according to need. FIG. 14 is a flowchart illustrating the flow of a detailed process in the example 1 of the fourth embodiment. FIG. 15 is a view illustrating the concept of processing in the example 1 of the fourth embodiment. It is assumed that taken images 311 to 313 belong to a first image group 31 and taken at the time t1 to t3, respectively. It is also assumed that taken images 321 to 323 belong to a second image group 32 and taken at the time t1 to t3, respectively.

In FIG. 14, the determination means 17 first makes a comparison between images in the first image group in chronological order and calculates the speed of approach (S51). In the example of FIG. 15, the determination means 17 compares detection results between the taken image 311 and the taken image 312 that belong to the first image group 31 and also compares detection results between the taken image 312 and the taken image 313 that belong to the first image group 31, and thereby calculates the moving distance of an object. Then, the determination means 17 calculates the speed of approach of the object in the first image group 31 based on the moving distance and a time interval between from the time t1 to the time t3.

Likewise, the determination means 17 makes a comparison between images in the second image group in chronological order and calculates the speed of approach (S52). In the example of FIG. 15, the determination means 17 compares detection results between the taken image 321 and the taken image 322 that belong to the second image group 32, and also compares detection results between the taken image 322 and the taken image 323 that belong to the second image group 32, and thereby calculates the moving distance of the object. Then, the determination means 17 calculates the speed of approach of the object in the second image group 32 based on the moving distance and a time interval between from the time t1 to the time t3. Note that Steps S51 and S52 are not necessarily performed in parallel, as long as the determination means 17 calculates the speed of approach for each image group.

Next, the determination means 17 selects an image group with a higher speed of approach among the plurality of image groups (S53). Specifically, the determination means 17 compares the speeds of approach calculated in Steps S51 and S52 and determines in which of the first image group 31 and the second image group 32 the speed of approach is higher and selects one. Then, the determination means 17 determines the degree of movement of the object by using the speed of approach in the selected image group (S54). For example, the determination means 17 determines whether the selected speed of approach is equal to or higher than a specified reference value or not, and when it is equal to or higher than the specified reference value, determines that the object is approaching the movable body 1*b* at a higher speed than normal.

After that, the warning means 13*b* issues a warning in accordance with the speed of approach by using the selected image group (S55). For example, when the speed of approach is equal to or higher than a reference value, the warning means 13*b* issues a higher level of warning than when the speed of approach is lower than the reference value. The issuance of a higher level of warning is described hereinafter. For example, the warning means 13*b* may modify an image belonging to the selected image group so as to highlight the object included in the image and then output the image to the display device 21. Note that highlighting may include drawing a rectangle line around an object, placing a mark on or above an object, changing the color of an object or the like, for example. In other words, the warning means 13*b* may perform processing corresponding to the second warning processing described above.

Figure 16:
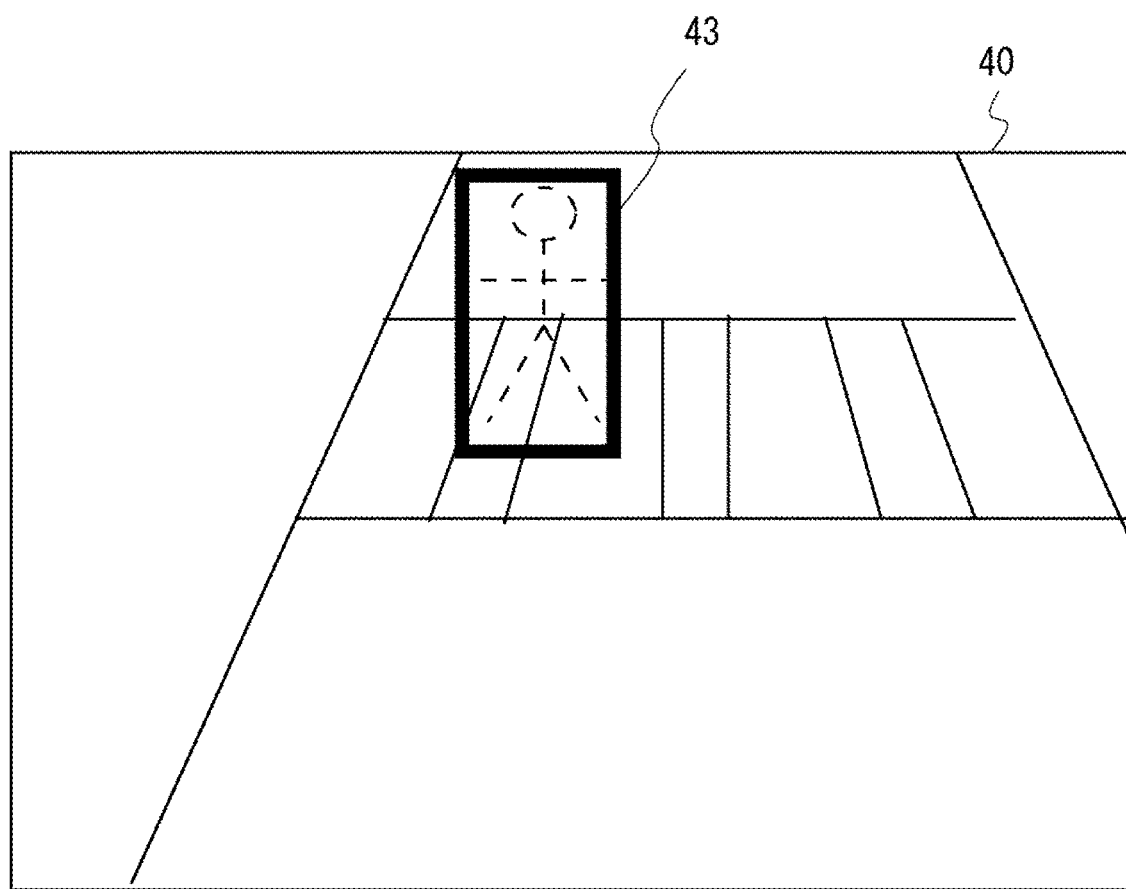
FIG. 16 is a view showing an example of displaying an image with the position of an object highlighted in the example 1 of the fourth embodiment.

FIG. 16 is a view showing an example of displaying an image with the position of an object highlighted in the example 1 of the fourth embodiment. A highlighted display area 43 is displayed on a display screen 40 in this example. Note that processing of issuing a higher level of warning is not limited thereto, and the warning means 13*b* may output a warning tone through the speaker 22, for example.

On the other hand, the case where the level of warning is not high compared with the above (for example, when the speed of approach is lower than a reference value) is also described as an example. In this case, the image that belongs to the selected image group is output to the display device 21 and displayed on the screen. At this time, the warning means 13*b* performs processing such as displaying the image belonging to the selected image group on the display device 21 without any modification, or, when modifying the image and displaying it on the display device 21, performs processing such as drawing a thinner line around an object, placing a different mark above an object, or changing the color of an object to be modified compared with the case where the level of warning is high. Further, in the case where the warning means 13*b* outputs a warning tone through the speaker 22, it performs processing such as changing the volume or changing the warning tone compared with the case where the level of warning is high. In other words, the warning means 13*b* may perform processing corresponding to the first warning processing described above.

As described above, in the example 1 of the fourth embodiment, the degree of movement of an object is determined by using a group of images taken by a more appropriate filter in the outside environment during a certain period of time, and it is thereby possible to issue an appropriate warning with use of an image with higher detection accuracy.

Because the object detection accuracy is high in each image that belongs to a group of images taken by an appropriate filter, a difference in the position of an object between images that are adjacent in chronological order is clear. Thus, the movement of the object can be clearly grasped. On the other hand, because the object detection accuracy is low in each image that belongs to a group of images taken by an inappropriate filter, a difference in the position of an object between images that are adjacent in chronological order is not clear. Thus, it is difficult to determine whether the object is moving or not. Therefore, the speed of approach is calculated to be relatively higher in the former than in the latter. Accordingly, the detection accuracy by a filter is relatively high in the image group where the speed of approach is calculated to be higher. By outputting an image in the image group with high detection accuracy on the screen or the like, a driver can adequately recognize the danger.

Further, for example, when the speed of approach exceeds a reference value, it is highly urgent and therefore the level of warning is further increased, thereby giving an appropriate warning to a driver. On the contrary, when an object is detected in an image taken at a certain time and no object is detected in an image taken at a later time, it is likely that the object is detected by mistake, or the object has moved away from the movable body 1*b*. In such a case, it is determined not to issue a warning, thereby avoiding an excessive warning.

Example 2

Figure 17:
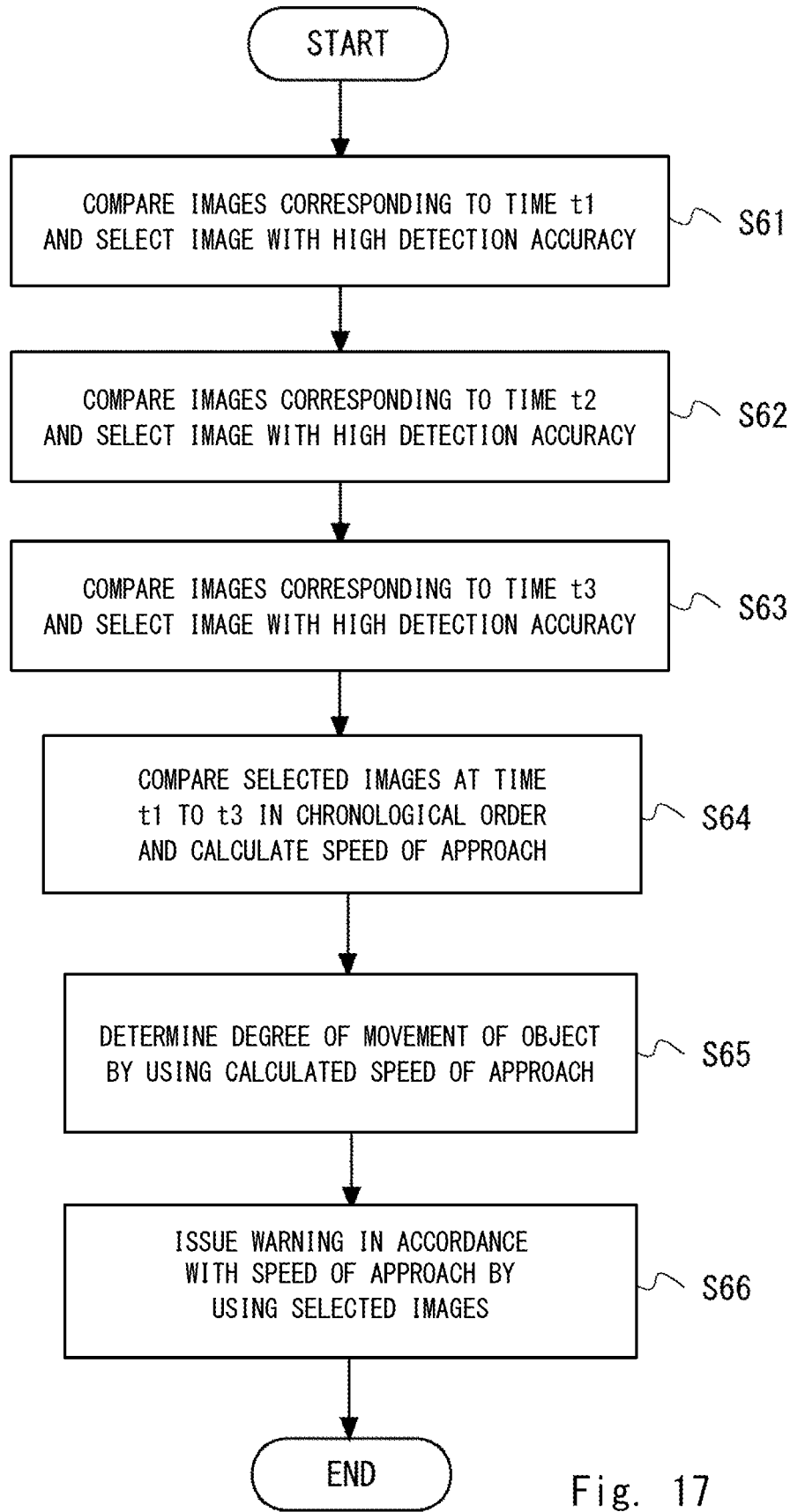
FIG. 17 is a flowchart illustrating the flow of a detailed process in an example 2 of the fourth embodiment.
Figure 18:
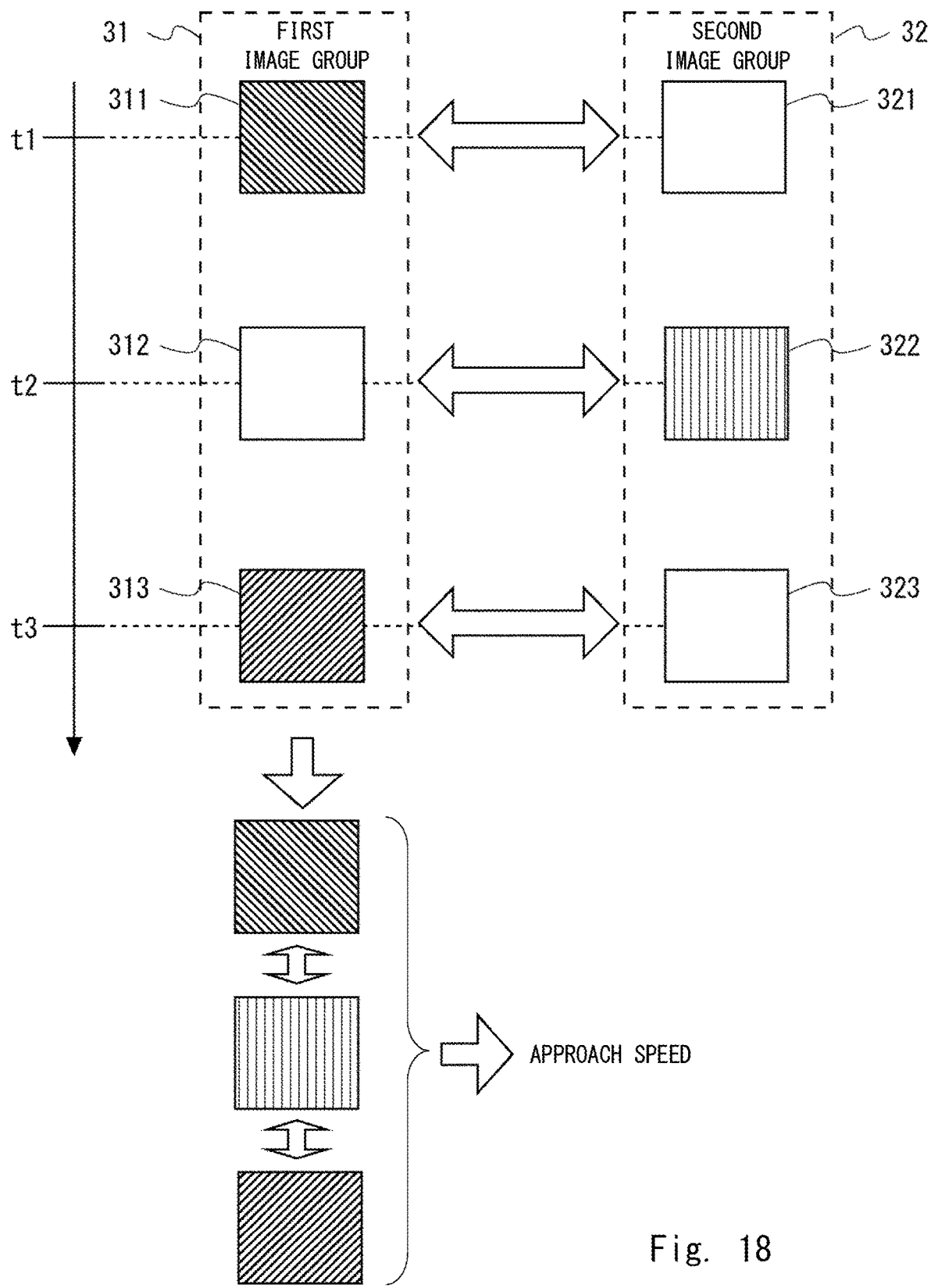
FIG. 18 is a view illustrating the concept of processing in the example 2 of the fourth embodiment.

In the example 2, an image with high detection accuracy is selected for each time period in order to deal with a sudden change in the outside environment. Processing of the example 2 is described hereinafter with reference to FIG. 17, and with reference also to FIG. 18 according to need. FIG. 17 is a flowchart illustrating the flow of a detailed process in the example 2 of the fourth embodiment. FIG. 18 is a view illustrating the concept of processing in the example 2 of the fourth embodiment.

First, the determination means 17 compares images corresponding to the time t1 and selects one image with higher detection accuracy (S61). For example, a comparison of detection accuracy between images corresponding to the time may be made by detecting the degree of matching by pattern matching techniques or the like with use of a parameter related to the detected appearance and a comparative parameter, which are used for detection results described above, and comparing the results. Next, the determination means 17 compares images corresponding to the time t2 and selects one image with higher detection accuracy (S62). Likewise, the determination means 17 compares images corresponding to the time t3 and selects one image with higher detection accuracy (S63). Note that the order of performing Steps S61 to S63 is not limited thereto.

In the example of FIG. 18, the determination means 17 compares detection results between the taken image 311 and the taken image 321 corresponding to the time t1 and selects the taken image 311 with higher detection accuracy. Likewise, the determination means 17 compares detection results between the taken image 312 and the taken image 322 corresponding to the time t2 and selects the taken image 322 with higher detection accuracy. Further, the determination means 17 compares detection results between the taken image 313 and the taken image 323 corresponding to the time t3 and selects the taken image 313 with higher detection accuracy.

After that, the determination means 17 compares the selected images at the time t1 to t3 in chronological order and calculates the speed of approach (S64). In the example of FIG. 18, the determination means 17 calculates the speed of approach from the taken image 311, the taken image 322 and the taken image 313 as one image group.

Then, the determination means 17 determines the degree of movement of the object by using the calculated speed of approach (S65). The warning means 13*b* then issues a warning in accordance with the speed of approach by using each of the selected images (S66). Note that, in Steps S65 and S66, the level of warning may be increased as shown in FIG. 16 when the speed of approach is equal to or higher than a reference value.

As described above, in the example 2 of the fourth embodiment, it is possible to appropriately determine the degree of movement of an object and issue an appropriate warning in the case where there is a sudden change in the outside environment within a certain period of time. The case where there is a sudden change in the outside environment within a certain period of time is, for example, the case where the brightness of the surrounding area abruptly changes, such as before and after entering a tunnel, before and after coming out of a tunnel, when the weather changes quickly due to rapid movement of clouds or the like. In such a case, while the detection accuracy of the first image group taken by the first filter characteristics is higher until a certain point of time, the detection accuracy of the first image group decreases halfway through, and the detection accuracy of the second image group taken by the second filter characteristics can become higher. Further, when the brightness is not stable due to the sunset and clouds, the image group with higher detection accuracy can be in alternation as shown in FIG. 18.

Because the example 2 makes a comparison of the detection accuracy for each time an image is taken, it is possible to select images taken by appropriate filter characteristics for the brightness at each time and form an image group with high detection accuracy by a set of the selected images. It is thereby possible to calculate the speed of approach with high reliability and issue an appropriate warning.

Example 3

Figure 19:
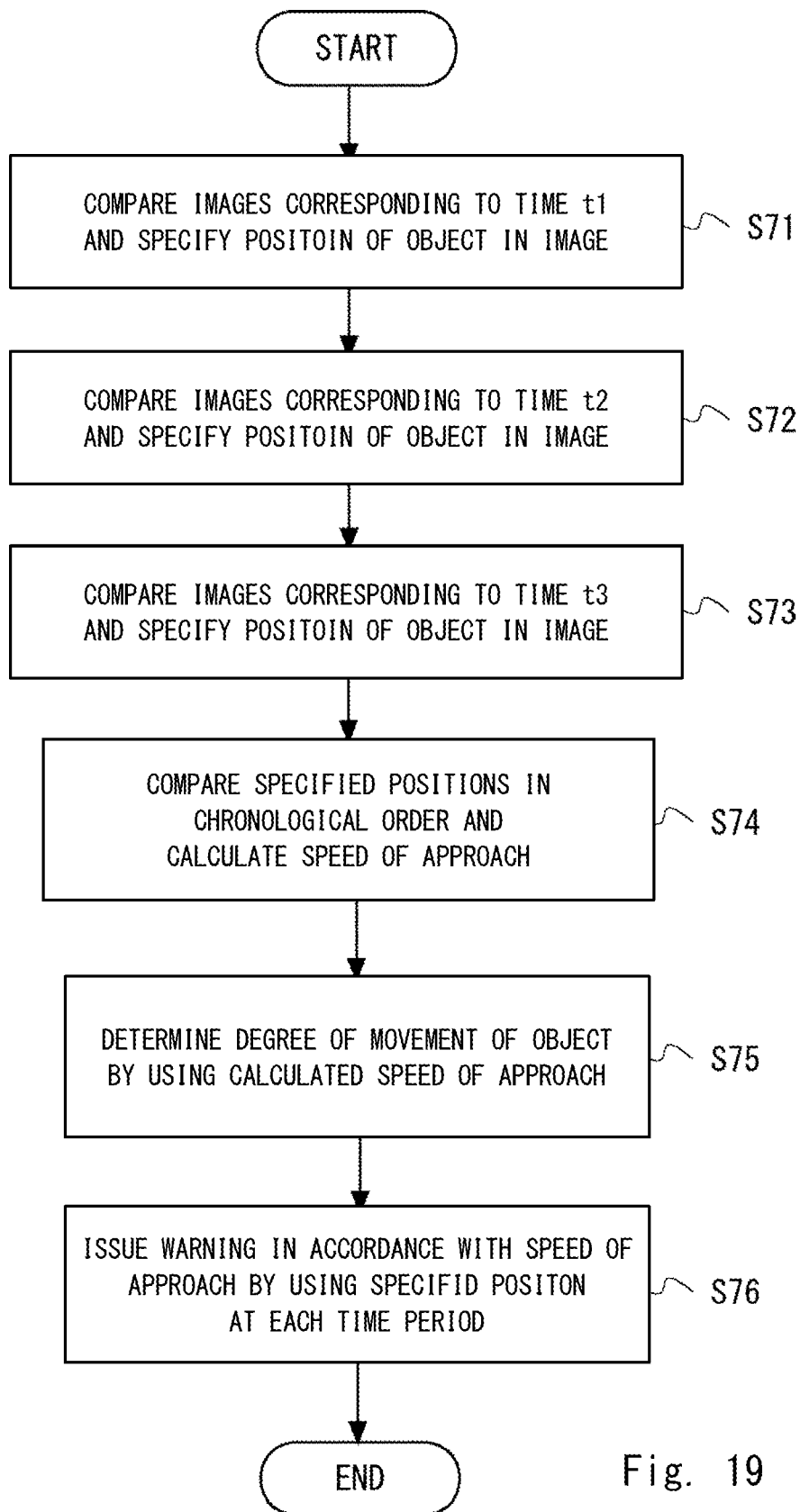
FIG. 19 is a flowchart illustrating the flow of a detailed process in an example 3 of the fourth embodiment.
Figure 20:
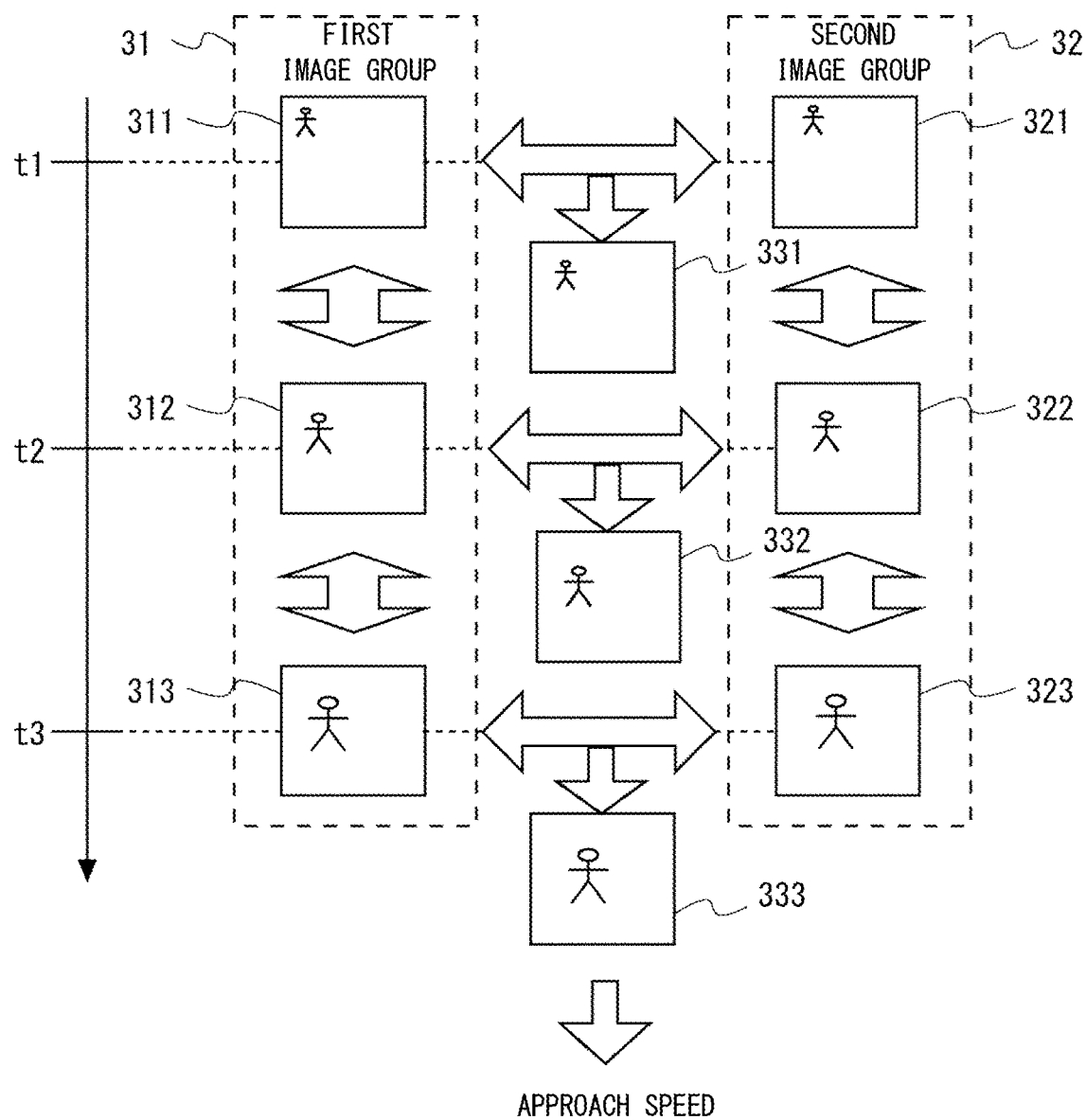
FIG. 20 is a view illustrating the concept of processing in the example 3 of the fourth embodiment.

In the example 3, when it is difficult to determine appropriate filter characteristics for the outside environment among a plurality of filter characteristics, images taken by the respective filter characteristics are synthesized to enhance the detection accuracy. Processing of the example 3 is described hereinafter with reference to FIG. 19, and with reference also to FIG. 20 according to need. FIG. 19 is a flowchart illustrating the flow of a detailed process in the example 3 of the fourth embodiment. FIG. 20 is a view illustrating the concept of processing in the example 3 of the fourth embodiment.

First, the determination means 17 compares images corresponding to the time t1 and specifies the position of an object in the image (S71). Next, the determination means 17 compares images corresponding to the time t2 and specifies the position of an object in the image (S72). Likewise, the determination means 17 compares images corresponding to the time t3 and specifies the position of an object in the image (S73). Note that, the processing of specifying the position may calculate the average of the positions of an object in the images to be compared. Further, the images to be compared may be synthesized. Note that the order of performing Steps S71 to S73 is not limited thereto.

In the example of FIG. 20, the determination means 17 specifies, from the taken image 311 and the taken image 321 corresponding to the time t1, the position of an object as an intermediate position between them. Likewise, the determination means 17 compares the taken image 312 and the taken image 322 corresponding to the time t2, compares the taken image 313 and the taken image 323 corresponding to the time t3, and specifies the positions of an object as intermediate positions between them.

After that, the determination means 17 compares the specified positions in chronological order and calculates the speed of approach (S74). In the example of FIG. 20, the determination means 17 calculates the speed of approach by using the images 331, 332 and 333 as one image group.

Then, the determination means 17 determines the degree of movement of the object by using the calculated speed of approach (S75). The warning means 13b then issues a warning in accordance with the speed of approach by using the specified position of the object in each time period (S76). Note that, in Steps S75 and S76, the level of warning may be increased as shown in FIG. 16 when the speed of approach is equal to or higher than a reference value.

As described above, in the example 3 of the fourth embodiment, the average or the like is calculated from detection results of the respective image groups, and therefore the effect of false determination can be suppressed. Further, when it is in the early evening, for example, the brightness in the area around the movable body 1b is between the daytime and the nighttime, and it is sometimes difficult to determine which of the first filter characteristics and the second filter characteristics is appropriate for use. Even in such a case, by calculating an intermediate position between the two detection results, it is possible to specify the position of an object with adequate accuracy. It is thereby possible to maintain the object detection accuracy by using a plurality of image groups in a comprehensive manner.

Fifth Embodiment of the Invention

A fifth embodiment is a modified example of the fourth embodiment described above. While the image acquisition means 11b includes two imaging devices in the fourth embodiment described above, an image acquisition means according to the fifth embodiment includes one imaging device. Note that the configuration of the image acquisition means according to the fifth embodiment is the same as shown in FIG. 10 described above, and the illustration and the detailed description thereof are omitted. Note that the switch means 1133 in the image acquisition means according to the fifth embodiment takes images by switching a plurality of filter characteristics on a regular basis and can thereby take images of the same target substantially in parallel by the plurality of imaging devices.

As described above, the same advantages as in the fourth embodiment described above can be obtained also in the fifth embodiment. Further, any of the examples 1 to 3 described above can be applied to the fifth embodiment.

Note that the detection means 12b may compare the detection results between images in each of image groups in chronological order, calculate the speed of approach to the object for each of the image groups, select the image group with the highest speed of approach among the plurality of image groups, and determine the degree of movement of the object in the selected image group.

Other Embodiment of the Invention

The above-described examples can be combined as desirable. Specifically, the second embodiment and the third embodiment may be combined.

Although the exemplary embodiment of the present invention is described in the foregoing, the present invention is not restricted to the above-described configuration, and various changes, modifications and combinations as would be obvious to one skilled in the art may be made without departing from the scope of the invention.

Arbitrary processing of the on-vehicle device described above may be implemented by causing a CPU (Central Processing Unit) to execute a computer program to perform given processing. In this case, the computer program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Further, in addition to the case where the functions of the above-described exemplary embodiment are implemented by causing a computer to execute a program for implementing the functions of the above-described exemplary embodiment, the case where the functions of the above-described exemplary embodiment are implemented by this program in cooperation with the an OS (Operating System) or application software running on the computer is also included in the exemplary embodiment of the present invention. Further, the case where all or part of the processes of this program are executed by a function enhancement board inserted into the computer or a function enhancement unit connected to the computer to implement the functions of the above-described exemplary embodiment is also included in the exemplary embodiment of the present invention.

According to the embodiment, it is possible to provide a warning device, a warning method and a warning program for issuing an appropriate warning based on detection of an object even under the circumstances where it is difficult to determine the outside environment of a movable body.

Further, according to the embodiment, it is possible to provide a warning device, a warning method and a warning program for maintaining the accuracy of detecting the movement of an object and issuing an appropriate warning even under the circumstances where it is difficult to determine the outside environment of a movable body.

The exemplary embodiment is applicable to a warning device that is mounted on a movable body including a vehicle, and it has an industrial applicability.

What is claimed is:

1. A warning device comprising:
   at least one memory storing instructions, and
   a processor configured to execute the instructions to:
      acquire an image group including a plurality of images taken in succession;
      perform detection of an object on each of images in the image group;
      compare detection results of the object in the image group in chronological order and determine a degree of movement of the object; and
      issue a warning in accordance with the determined degree of movement,
      acquire a plurality of image groups respectively based on a plurality of filter characteristics;
      compare corresponding images between the plurality of image groups and thereby specify a position of the object in the image for each time period;
      compare the specified positions in chronological order; and
      determine the degree of movement of the object.

2. The warning device according to claim 1, wherein the processor is further configured to execute the instructions to:
   compare detection results between images in each image group in chronological order, calculate an approach speed to the object for each image group, and determine whether the approach speed is equal to or higher than a reference value, and
   when the approach speed is equal to or higher than the reference value, the processor is further configured to execute the instructions to issue a higher level of warning than when the approach speed is lower than the reference value.

3. A warning method comprising:
   acquiring an image group including a plurality of images taken in succession;
   performing detection of an object on each of images in the image group;
   comparing detection results of the object in the image group in chronological order and determining a degree of movement of the object; and
   issuing a warning in accordance with the determined degree of movement,
   wherein the acquiring the image group acquires a plurality of image groups respectively based on a plurality of filter characteristics,
   wherein the comparing detection results compares corresponding images between the plurality of image groups and thereby specifies a position of the object in the image for each time period, and
   wherein the determining the degree compares the specified positions in chronological order, and determines the degree of movement of the object.

4. A non-transitory computer readable medium storing a warning program for causing a computer to execute:
   acquiring an image group including a plurality of images taken in succession;
   performing detection of an object on each of images in the image group;
   comparing detection results of the object in the image group in chronological order and determining a degree of movement of the object; and
   issuing a warning in accordance with the determined degree of movement,
   wherein the acquiring the image group acquires a plurality of image groups respectively based on a plurality of filter characteristics,
   wherein the comparing detection results compares corresponding images between the plurality of image groups and thereby specifies a position of the object in the image for each time period, and
   wherein the determining the degree compares the specified positions in chronological order, and determines the degree of movement of the object.

5. The warning device according to claim 1, wherein the processor is configured to specify the position of the object in the image by calculating an average of the positions of the object in the images to be compared for said each time period.

6. The warning method according to claim 3, wherein the comparing detection results specifies the position of the object in the image by calculating an average of the positions of the object in the images to be compared for said each time period.

7. The non-transitory computer readable medium according to claim 4, wherein the comparing detection results specifies the position of the object in the image by calculating an average of the positions of the object in the images to be compared for said each time period.

\* \* \* \* \*